(12) United States Patent
Jones et al.

(10) Patent No.: US 8,337,366 B2
(45) Date of Patent: Dec. 25, 2012

(54) INTERACTIVE SYSTEM AND METHOD FOR BOXING AND MARTIAL ARTS

(75) Inventors: Terry G. Jones, Austin, TX (US); Redza Shah, Austin, TX (US); Jeffrey Eversmann, Austin, TX (US); Nathan Sewell, Ojai, CA (US); Brian Bates, Bandera, TX (US); Joshua Eversmann, Austin, TX (US)

(73) Assignee: Nexersys Corporation

( * ) Notice: Subject to any disclaimer, the term of this patent is extended or adjusted under 35 U.S.C. 154(b) by 0 days.

(21) Appl. No.: 13/234,110

(22) Filed: Sep. 15, 2011

(65) Prior Publication Data

US 2012/0108394 A1 May 3, 2012

Related U.S. Application Data

(63) Continuation-in-part of application No. 12/917,199, filed on Nov. 1, 2010, now Pat. No. 8,079,938.

(51) Int. Cl.
*A63B 71/00* (2006.01)
*A63B 69/34* (2006.01)

(52) U.S. Cl. .................... 482/8; 482/83; 482/84

(58) Field of Classification Search ............... 482/1–9, 482/83, 84, 900–902; 434/247
See application file for complete search history.

(56) References Cited

U.S. PATENT DOCUMENTS

| | | | |
|---|---|---|---|
| 5,733,193 A | 3/1998 | Allard et al. | |
| 7,128,692 B2 * | 10/2006 | Black | 482/8 |
| 7,625,319 B2 * | 12/2009 | Kang et al. | 482/83 |
| 7,698,830 B2 * | 4/2010 | Townsend et al. | 33/512 |
| 7,909,749 B2 * | 3/2011 | Sheedy | 482/148 |
| 2003/0060340 A1 * | 3/2003 | Freeman | 482/83 |
| 2005/0181913 A1 | 8/2005 | Vang | |
| 2005/0209066 A1 * | 9/2005 | Penney | 482/84 |
| 2005/0266967 A1 | 12/2005 | Considine et al. | |
| 2005/0288159 A1 * | 12/2005 | Tackett | 482/84 |
| 2010/0130329 A1 | 5/2010 | Sullivan | |

* cited by examiner

*Primary Examiner* — Glenn Richman
(74) *Attorney, Agent, or Firm* — The Law Firm of H. Dale Langley, Jr.

(57) ABSTRACT

A boxing or martial arts training and exercise device may include punching pads locationally displaced on a frame. Respective pads may be positioned in support on the frame for punching and kicking. Each pad can communicatively connect to one or more impact sensor. Each impact sensor can communicatively connect to a control unit. The control unit may be communicatively connected to a display. The impact sensor detects strikes to the pad. The impact sensor includes an accelerometer and a signal processor. The control unit includes an aggregator for receiving and logging strike metrics. The control unit directs sequences in the display according to a routine, and delivers indicators of strike metrics. The control unit includes a user interface for selection among sequences, as well as for selection of various menu items. A video of a human instructor or an animated avatar is viewable in a display.

16 Claims, 15 Drawing Sheets

INTERACTIVE SYSTEM AND METHOD FOR BOXING AND MARTIAL ARTS

CROSS-REFERENCE TO RELATED APPLICATIONS

The present application is a continuation-in-part and has benefit of priority of U.S. patent application Ser. No. 12/917,199, titled "Boxing and Martial Arts Fight, Trainer and Game System and Method", filed Nov. 1, 2010 now U.S. Pat. No. 8,079,938, which application has at least one same inventor of the present application and is herein incorporated by this reference.

TECHNICAL FIELD

The invention generally relates to punching and kicking machines for coaching, training, and workouts, and more specifically relates to punching and kicking systems and methods with automated interactive components providing feedback for techniques, training, and exercise.

BACKGROUND

Boxing and martial arts are popular sports and also are often used as exercise regimens (references in this disclosure to "boxing" include the broader category of all punching or striking activities, such as, for example, in martial arts with hand or foot punches or other striking maneuvers or actions). Because of the popularity of boxing, there have been a number of boxing- and game-related apparatuses over the years. These include devices as simple as punching bags (e.g., The BAS/Body Action System™ endorsed by Bas Ruttens) or as complicated as arcade electronic processor equipment (e.g., the Don King Boxing computer arcade game which employs the Wii™ apparatus from Nintendo of America Inc.). The BAS/Body Action System™ provides punching pads disposed on a rigid frame for hand, foot and/or head punch by a user. The Wii™ device is a handheld unit that incorporates accelerometers, which allow a user holding the Wii™ device in the hand to move the hand (i.e., shadow box into thin air) without hitting or contacting anything, to play a boxing video game operable on a devoted game console unit and a television set.

Simple punching bags (even in designs where pads are disposed on a frame, such as the BAS product) provide only a punching surface. The user must resort to a human coach or trainer to observe the punching and provide instruction or guidance in techniques, force, regimen and the like. Certain of these conventional punching bag devices may be packaged with a compact disk of video and/or sound instruction, but these do not operate in conjunction with punching bags for automated real-time detection or assessment of actual strikes or movements of the user.

The Wii™ apparatus for games senses transposition of a hand that is holding the apparatus during play of a boxing game operating on the game play unit. The device is not intended or used for actual striking or punching, and striking or punching while holding the device would likely lead to breakage. The apparatus is merely held in hand as the hand is moved through the surroundings in thin air, and thereby detection of the hand's movement in dimensional space is registered by the game play unit. The boxing game operates on the game play unit, and the hand-held Wii™ apparatus delivers an input signal to the game. The game proceeds through pre-programmed sequences that deliver audio and visual direction to the player for hand movements that will register game points. The user merely moves his hand holding the apparatus, but never actually strikes any surface. Based on extent of the user's hand movement in concert with the pre-programmed directions of the game, the user may score points in the game. The Wii™ apparatus in operation of the boxing game cannot instruct the game player as to proper techniques, force, regimen and the like in response to the player's action. For actual boxing training with strikes and punches, the game is insufficient to truly prepare, train and exercise for real boxing with physical contact. Of course, a game player punching a hand into thin air is not a realistic or real-life comparator for actual punching or kicking to encounter a tangible object.

In the past, certain arcade games have had limited functionality of single punching surface or object to score in the games. However, these games have provided only limited feedback to the user related to the game itself, and in any event the feedback has been devoted to purposes of the arcade game and not geared to instruction in true boxing instruction, preparation, and training For instance, U.S. Pat. No. 5,733,193 is for an arcade game where a user hits a punching bag and the game tracks as user feedback how many times the bag is hit. The arcade game of the '193 patent, however, does not include any teaching or training of a user in proper boxing techniques, force, or exercise regimen, nor does the game include multiple punching bags for varying types of punching or kicking as would be desirable to mimic real-life boxing conditions.

A drawback with conventional boxing and punching devices has been that injury can result to users who lack instruction, preparation and training for proper boxing techniques, punch force, exercise regimen and the like. A human coach or trainer is needed to provide guidance to the user. Though this concern may not apply to devices which lack punching bags or pads for physical striking by the user, devices without bags or pads for striking cannot provide realistic boxing and training. Conventional devices have also presented other issues to those desiring a realistic boxing instruction and training device, for example, strike prompts and sequence indicators in the devices can discourage users if operations are not consistent with the user's abilities.

In light of the drawbacks and limitations, there is a need for new and improved systems and methods for boxing instruction, preparation, and training, which assist in proper boxing technique, punching force, exercise regimen, and which can provide realistic boxing scenarios and circumstances.

SUMMARY

An embodiment of the invention is a an interactive boxing apparatus including a frame, a series of arms connected to the frame and outwardly extending from the frame, one or more pad connected to respective ones of the series of arms, an impact sensor communicatively connected to each pad, a control unit communicatively connected with the impact sensor, and a display connected to the control unit.

Another embodiment of the invention is an interactive boxing apparatus including a movement resistive punch pad, a sensor communicatively connected to the punch pad, for detecting any strike to the punch pad, a processor connected to the sensor, responsive to detection by the sensor of any strike of the punch pad, a module communicatively connected to the processor, controlled by the processor responsive to any strike of the punch pad on detection by the sensor, and a media display communicatively connected to the processor, the processor directs output by the media display in response to control of the module by the processor.

Yet another embodiment of the invention is a method of boxing including outputting a media item on a display, detecting a punch to a pad by a sensor, signaling a controller by the sensor in response to the step of detecting, and controlling the media item on the display by the controller in response to the step of signaling.

Another embodiment of the invention is a method of boxing including providing a frame, a series of arms connected to the frame and outwardly extending from the frame, one or more pad connected to respective ones of the series of arms, an impact sensor communicatively connected to each pad, a control unit communicatively connected with the impact sensor; and a display connected to the control unit. The method further includes outputting a media item on the display, detecting acceleration of the one or more pad and an identity of the pad so accelerated, signaling a controller by the impact sensor with the identity of the pad so accelerated, and controlling the media item on the display by the controller in response to the step of signaling. The media item in the step of outputting selectively corresponds to the steps of detecting, signaling, and controlling for boxing instruction.

Yet another embodiment of the invention is a boxing apparatus including a pad, a sensor of the pad for detecting a strike to the pad, a controller communicatively connected to the sensor, and a display unit communicatively connected to the controller, for prompting a select type of strike to the pad.

Another embodiment of the invention is a boxing apparatus including a plurality of respective pads, a plurality of respective sensors, each sensor unique to one of the respective pad, for detecting a strike to the respective pad, a controller communicatively connected to the plurality of sensors, and a display unit communicatively connected to the controller, for prompting strike to at least a select one of the respective pad.

Yet another embodiment of the invention is a boxing apparatus including a pad, a strike sensor of the pad, for detecting strike to the pad, a controller communicatively connected to the sensor, a display unit communicatively connected to the controller, and a type sensor communicatively connected to the controller, for distinguishing a type of strike to the pad.

Another embodiment of the invention is a boxing apparatus including a plurality of pads, a sensor connected to at least one pad of the plurality for detecting a strike to the pad, a controller communicatively connected to the sensor, and a display unit communicatively connected to the controller, for outputting video and audio for boxing training in strike technique and quantitative feedback of actual strike results to the pad.

Another embodiment of the invention is a boxing apparatus including a plurality of pads, a sensor connected to at least one pad of the plurality for detecting a strike to the pad, a controller communicatively connected to the sensor, and a display unit communicatively connected to the controller, for outputting video and audio for boxing training in strike technique and qualitative feedback of actual strike results to the pad.

Yet another embodiment of the invention is a sensor unit for a boxing apparatus including an accelerometer for measuring a strike and a signal processor communicatively connected to the accelerometer, for discerning the strike and calculating values relative to a peak acceleration, direction, total work, and total energy for the strike.

Another embodiment of the invention is a method of varying an operation of a boxing apparatus to accommodate input of a user of the boxing apparatus responsive to direction of the boxing apparatus. The method includes setting a maximum duration for the user input, prompting the user input, timing for the maximum duration, detecting if the user input is received, returning to the step of prompting upon receipt of the user input if prior to expiration of the maximum duration, and returning to the step of prompting upon expiration of the maximum duration if the user input is not received.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
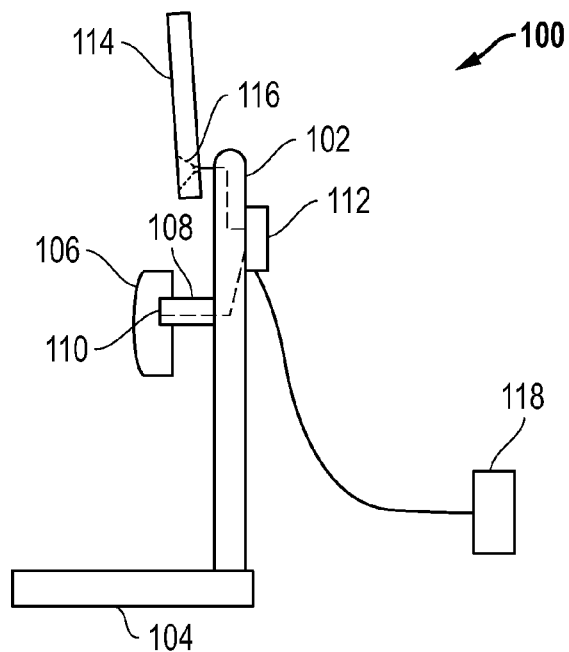
FIG. 1 illustrates a perspective view of a boxing apparatus, according to certain embodiments of the invention.

Referring to FIG. 1, a system 100 for boxing instruction, training, technique, and regimen includes an upright member 102 and a base 104 connected to the upright member 102. One or more force resisting member 108 is connected to or incorporated in the upright member 102. One or more strike pad 106 is disposed on the force resisting member 108.

One or more impact sensor 110 (shown in phantom in FIG. 1) 1 is directly or indirectly coupled or communicatively connected with the one or more pad 106, sufficient for the impact sensor 110 to detect any force impact to the pad 106, for example, from touch, strike, or punch to the pad 106. One or more control unit 112 of the system 100 is communicatively connected to the one or more impact sensor 110 during operation of the system 100. The control unit 112 can, but need not necessarily, include or connect to a visual display 114, a speaker or similar audio device 116 (shown in phantom incorporated in the display 114 in FIG. 1) and/or another output apparatus or connected peripheral unit (not shown in FIG. 1) capable of communicating with a user of the system 100.

In operation, a user of the system 100 touches, strikes, or punches the pad 106 (or, if more than one pad 106, selectively chooses which pad 106 to touch or strike/punch), such as, for example, in a scenario of simulated boxing by the user. The impact sensor 110 coupled with the pad 106 detects the user's touch, strike or punch to the pad 106. The control unit 112 is alerted that the sensor 110 has detected the impact. The control unit 112 registers occurrence of impact to the pad 106, for example, including by storing a time of the impact and force of the impact. Responsive to the registration of the impact by the control unit 112, the control unit 112 then selectively instructs the user to take subsequent action. For example, in response to the detected impact, the control unit 112 initiates particular media output to the visual display 114 and/or the speaker 116, or otherwise, which output directs the user to again touch, punch, kick or otherwise impact the one or more pad 106 (of, if more than one of the pad 106 in the system 100, a select one or more of them) or other instruction. Other examples of such output controlled by the control unit 112 include, but are not limited to, instructions for technique, training, exercise regimen, and further operation of the system 100 by the user.

According to certain embodiments of the system 100, during use of the system 100, the one or more pad 106 is each moveable (e.g., via tensioned pivots and springs, or force resisting device) with respect to the upright member 102 in a generally lateral and generally perpendicular (as viewed from the left side in FIG. 1) relation to the upright member 102, a generally upward/downward and generally parallel (as viewed from the left side in FIG. 1) relation to the upright member 102, or combinations of these. In effect, each pad 106 has either two or three dimensions of movement with respect to the upright member 102. For example, the pad 106 can move via force towards the upright member 102 by compression or the like, the pad 106 can move left or right to the upright member 102 (when viewed from the left side in FIG. 1) by pivoting arms attaching the pad 106 to the upright member 102, the pad 106 can move upward or downward to the upright member 102 by pivoting arms attaching the pad 106 to the upright member 102, or the pad 106 can move through force in combinations of these. Embodiments can alternately provide force resistive movement of the pad 106 in other spatial dimensions or combinations, as per selection among types of connector assembly (e.g., arm, pivots, springs, joint and the like) for attaching the pad 106 to the upright member 102 for desired force resistance for boxing as herein disclosed.

Figure 2:
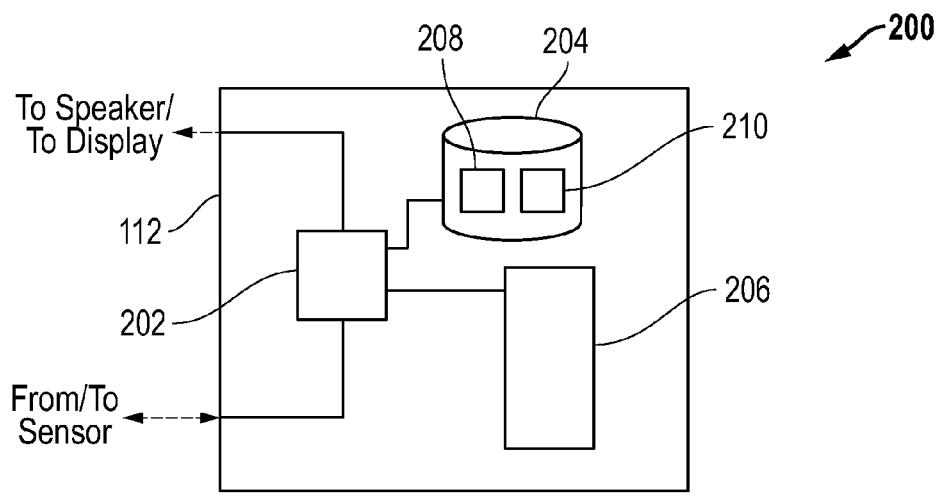
FIG. 2 illustrates a control unit of a boxing apparatus, according to certain embodiments.

Referring to FIG. 2, an exemplary control unit 200, such as may be employed in the system 100, includes a controller 202 communicatively connected to one or more of the impact sensor 110. The controller 202 may be implemented in hardware circuit(s), software program(s), or combinations of these. An example of the controller 202 is a processor or other control circuit, or pluralities or combinations of these, operating a software program stored in a computer readable non-transitory memory. The controller 202 is communicatively connected to an output apparatus that is interpretable to the user, for example, the visual display 114 and/or audio device 116 (each shown in FIG. 1). Memory 206 and data storage 204 are also connected to the controller 202 if a microprocessor or other circuit, for operation and store of the software program. A power source 118, such as an AC or DC electricity source, is connected to and supplies the control unit 112.

Figure 3:
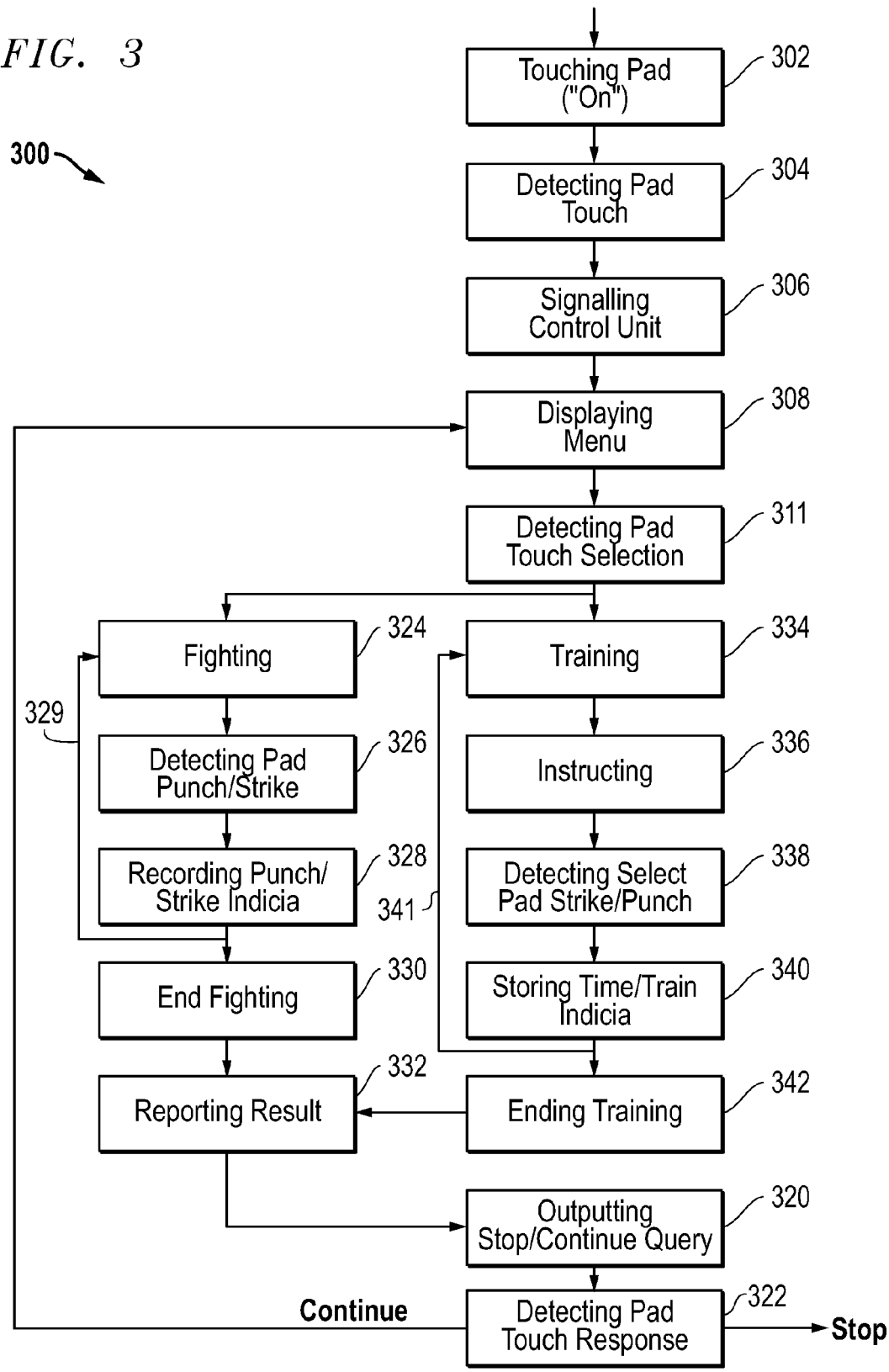
FIG. 3 illustrates a method of boxing by a boxing apparatus, according to certain embodiments of the invention.

Referring to FIG. 3, in conjunction with FIGS. 1 and 2, a method 300 of boxing fighting and training such as may be performed by the system 100 of FIG. 1 when supplied with power, commences with a step 302 of touch impact to one or more of the pad 106. If more than one pad 106, a selection of particular pad 106 (according to design of the system 100) commences the method 300. In certain embodiments, the step 302 is instigated through tap or touch of the pad 106, as compared to a strike or punch to the pad 106.

In a step 304, the touch to the pad 106 in the step 302 is detected by the impact sensor 110 for the pad 106. The control unit 112 is signaled in a step 306 that the impact sensor 110 detected the touch to the pad 106. Upon the step 306, the control unit 112, in a step 308, controls an output device of the system 100, for example, the display 114 and/or the speaker 116, to provide a readable or audible selection menu (not shown in Figures).

An item of the selection menu is chosen by user-input to the system 100, for example, touch of the pad 106 (or a select one or more of the pad 106, if more than one), and the pad touch for the item selected is detected in a step 310. Examples of possible items which may be selected from the menu may include Fighting or Training, but are not limited to these, and may include others or alternatives, such as Coaching (not shown in Figures) or others. Once the item selection is detected in the step 310, the control unit 112 processes and commences a selected routine, e.g., fighting, training, or other sequence, per the selected menu item. Examples of possible boxing routine include, for example, fighting sequences, training sequences, or others such as coaching sequences. Each boxing routine is, for example, hardware logic circuits, a software routine stored in a computer readable non-transitory memory, or combinations of these, processed by the control unit 112.

If Fighting 324 is selected, fighting sequences are commenced in a step 324. In the step 324, the control unit 112 processes a fight module 208 (shown in FIG. 2 as software stored in the data storage 204, but which can alternately be a software routine stored in another computer readable non-transitory memory, hardware logic circuits, and/or combinations). The fight module 208 is processed in the step 324 by the control unit 112 to output an avatar fighter displayed on the visual display 114, to output audio on the speaker 116, and/or to output to other media. The output of the processing by the control unit 112 includes, for example, data sets or files suitable for displaying and/or audibly depicting the avatar fighter having punch/strike locations of the fighter's body corresponding generally to relative position of the one or more pad 106 (i.e., such that the one or more pad 106 are positioned by the upright member 102 as would be approximated for the fighter if a standing opponent). If any pad 106 is punched or struck, the impact sensor 110 for the pad 106 detects the punch or strike in a step 326 and the control unit 112 is signaled of the detection. In a step 328, the control unit 112 registers one or more indicators of the strike or punch in response to the step 326.

The method 300 then proceeds with continued processing of the fight module 208 by the control unit 112 and output of additional fight sequences as shown by arrow 329 in FIG. 3, or otherwise the fight sequences are ended in a step 330. The fight sequences are ended in the step 330 either upon completed processing of the fight module 208 by the control unit 112 (such as at the end of a programmed routine of the module after fight sequences are output) or on receipt of an stop signal input to the control unit 112, for example, by an "off" or "end" mechanism of the system 100, such as through activation by a user of the system 100 of an off switch, entry of a key, punching in a particular sequence to the one or more pad 106, or other similar mechanism. Once processing of the fight module 208 is ended in the step 330, the control unit 112 reports a result in a step 332.

The result reported in the step 332 by the control unit 112 can be displays on the visual display 114 or audio of the speaker 116. These displays can provide information of statistics of registered punch/strike responses, measures of strike/punch count, accuracy and force, and/or other measures or information, such as information related to outcomes of the fighting sequences, comparisons to earlier fighting results, or others. Further in the reporting step 332, the control unit 112 can store the reported information and/or additionally process the result together with prior results of usage of the system 100 to yield a statistical comparison record (which may, but need not necessarily, be stored by the control unit). In certain embodiments, the control unit 112 in the reporting step 332 may label the result (or a record of it) with a tag, such as an identifier of the particular user of the system 100, a time or date indicator of that use, or other indicators for viewing or comparison at later time or place.

If rather than Fighting 324, Training 334 is selected in the step 311, training sequences are commenced in the step 334. In the step 334, the control unit 112 processes a train module 210 (shown in FIG. 2 as software stored in the data storage 204, but which can alternately be a software routine stored in another computer readable non-transitory memory, hardware logic circuits, and/or combinations). The train module 210 is processed in the step 334 by the control unit 112 to output a depiction of the one or more pad 106 for display on the visual display 114, for audio on the speaker 116, and/or to other media. The output of the control unit 112 on processing of the train module 210 includes, for example, data sets or files suitable for displaying and/or audibly depicting the one or more pad 106 and a prescribed selection of sequential ones of the pad 106. As each pad 106 is selected in sequence, the pad 106 may subsequently be punched or struck as boxing training Speed of sequential selection of the one or more pad 106 is controlled by the control unit 112 according to the processed train module 210. If any pad 106 is punched or struck, the impact sensor 110 for the pad 106 detects the punch or strike in a step 338 and the control unit 112 is signaled of the detection. In a step 340, the control unit 112 stores one or more indicators of the strike or punch in response to the step 338.

The method 300 then proceeds with continued processing of the train module 210 by the control unit 112 and output of additional train sequences as shown by arrow 339 in FIG. 3, or otherwise the train sequences are ended in a step 342. The train sequences are ended in the step 342 either upon completed processing of the train module 210 by the control unit 112 (such as at the end of a programmed routine of the module after train sequences are output) or on receipt of an stop signal input to the control unit 112, for example, by an "off" or "end" mechanism of the system 100, such as through activation by a user of the system 100 of an off switch, entry of a key, punching in a particular sequence to the one or more pad 106, or other similar mechanism. Once processing of the train module 210 is ended in the step 330, the control unit 112 reports a result of the steps of Training 339 in a step 332.

As with the result reported in the step 332 by the control unit 112 on end of processing of the fight module 208, the result can be displayed on the visual display 114 or audio of the speaker 116. These displays can provide information, such as with Fighting 324, of statistics of registered punch/strike responses, measures of strike/punch count, accuracy and force, and/or other measures or information, such as information related to outcomes of the fighting sequences, comparisons to earlier fighting results, or others. Further in the reporting step 332, the control unit 112 can store the reported information and/or additionally process the result together with prior results of usage of the system 100 to yield a statistical comparison record (which may, but need not necessarily, be stored by the control unit 112). The control unit 112 in the reporting step 332 may also label the result (or a record of it) with a tag in certain embodiments, such as an identifier of the particular user of the system 100, a time or date indicator of that use, or other indicators for viewing or comparison at later time or place.

In effect, Fighting 324 occurs against the output avatar fighter. In the fight sequences, the avatar fighter moves, punches, strikes, and otherwise responds (albeit through media graphics) to a system user's strikes and punches. Training 334, however, occurs through pad selection of the system and the user's punch and strike of selected pad. Varied levels of competency of the user may be selected by the user or the system, such as Beginner, Intermediate, Advanced, Expert or others, through menu items displayed via output of the control unit 112 on selection for Fighting 324 or Training 334 (or at other point in use of the system). Moreover, real-time results of the user's strike and punch actions may be displayed via output of the control unit 112 in either scenario. Real-time results may include, for example, strike and punch Accuracy, Count, Power, and Points Scored. In certain embodiments, the control unit 112 includes modules for processing heart rate and/or calories used by the user of the system during Fighting 324 or Training 334. Various embodiments can provide for particular regimen of Rounds or Bouts, in follow-up sequence, such as would be encountered by the system user in practice or training for boxing or general exercise through boxing. Other embodiments can allow for customization of the fight sequences and/or the train sequences, such as increase or decrease of Rounds, time of Rounds or Bouts, different sequences or times according to day of the week or period, play of boxing instruction tutorials as system output (e.g., instruction in techniques), adjustment of output volume or display, selection among specific Rounds or variation of sequences per Round, and custom routines operable by the control unit in the system.

Figure 4:
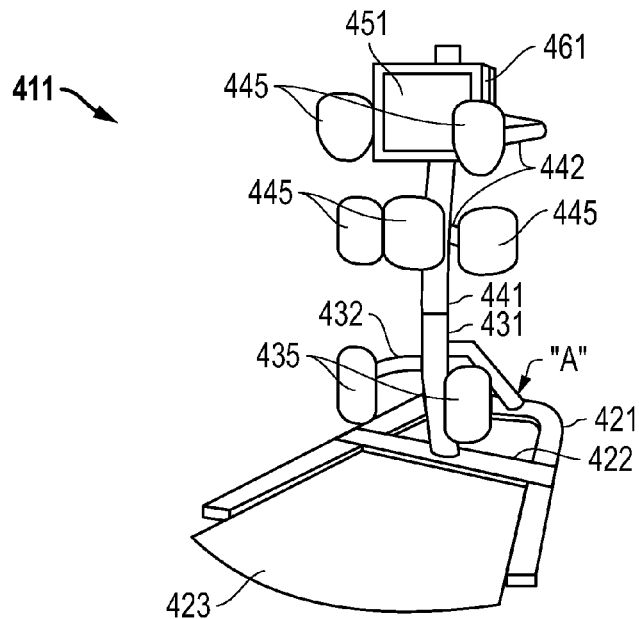
FIG. 4 illustrates a perspective view of an exemplary embodiment of a boxing apparatus of a series of arms and pads supported by a frame, according to certain embodiments of the invention.

Referring to FIG. 4, an exemplary embodiment of a boxing apparatus 411 according to FIG. 1 includes a u-shaped base 421 designed to rest on a floor, the ground, or other support surface. The base 421 is attached to a cross bar 422. The cross bar 422 provides added stability to the base 421 and apparatus 411. In certain embodiments, the cross bar 422 can, but need not necessarily, be formed as part of and incorporated with the base 421. For stability when the apparatus 411 is being punched, the base 421 is also attached (or incorporated) to a mat 423. The mat 423 is sized so that a user of the apparatus 411 can stand on mat 423 when striking the apparatus 411. The weight of the user on mat 423 further prevents the apparatus 411 from tipping over backwards or from overly swaying when the apparatus 411 is hit. In certain embodiments, an additional stability member (not shown in FIG. 4) may, but need not necessarily, extend from a closed portion (identified in FIG. 4 by arrow "A") of the u-shaped base 421 towards a back side (in the perspective view of FIG. 4) of the frame member 441 to further stabilize the apparatus 411. In alternatives, the base 421 may include wheels, rollers or sliding pads to allow the apparatus 411 to be easily moved in location on a floor or resting surface, and the apparatus 411 may include a handle, for example, connected to the frame element(s) of the apparatus 411 described here or below.

Attached to the cross bar 422 and rising vertically from the cross bar is a lower frame member 431. The lower frame member 431 has arms 432 that are attached to kicking pads 435. Lower frame member 431 may be hollow so that telescoping upper frame member 441 can slide into and out of member 431. A retaining member, such as a hand screw (not shown in FIG. 4), maintains the upper from member 441 in select extension from the lower frame member 431 when the apparatus is in use for boxing by a user. This telescoping aspect of upper frame member 441 allows the top portion of the apparatus to be adjusted to different heights depending on the height or particular desires of a user. In alternatives, a pneumatic shock can be included in the upper frame member 441 and lower frame member 431 to assist vertically lifting the upper frame member 441 with respect to the lower frame member 431 when adjusting height to accommodate users of the apparatus 411.

Upper frame member 441, in at least one embodiment of the invention, is a single vertical column, pipe, rod, or protrusion that has a series of arms 442 (not all are visible in FIG. 4) which are attached to a series of punching pads 445. In the embodiment of the invention shown in FIG. 4, there are five (5) punching pads 445 of the upper frame member 441 which are positioned such that each pad represents a different type of punch in boxing or martial arts (e.g., a body punch from the users left, a body punch from the users right, a head punch from the user's left, a head punch from the user's right and an uppercut). Punching pads 445 and kicking pads 435 may be made of any of a number of different materials and mixes of materials. For example the pads 445, 435 may be very similar to the focus mitts used by boxing or martial arts trainers who wear them on their hands during sparring or training (e.g., a foam or sponge type material covered by leather).

Punching pads 445 may be angled such that they face either inwardly or outwardly from the vertical plan defined by frame members 431 and 441 and cross bar 422. This angling of punching pads 445 is dependent on the location of the pad. For example, upper pads approximating punches to the head may be angled inwardly (for example, between about 15-35 degrees and more preferably about 25 degrees inward). On the other hand, the lower pads 435 (approximating kidney or leg punches) may be angled outwardly (for example, at an angle between about 5-20 degrees and most preferably at an outward angle of about 12 degrees). The center body pad 445 (located as middle pad 445 in FIG. 4) may be at a "head on" angle (for example, of about 0 degrees but with an upper cut angle of about 20-40 degrees or preferably about 30 degrees). Although other pad angles are possible, the pad is positioned in each instance to allow a user to hit punching pads 445 with their left or right hand in a way that approximates the user sparring with an actual person or a trainer.

Figure 5:
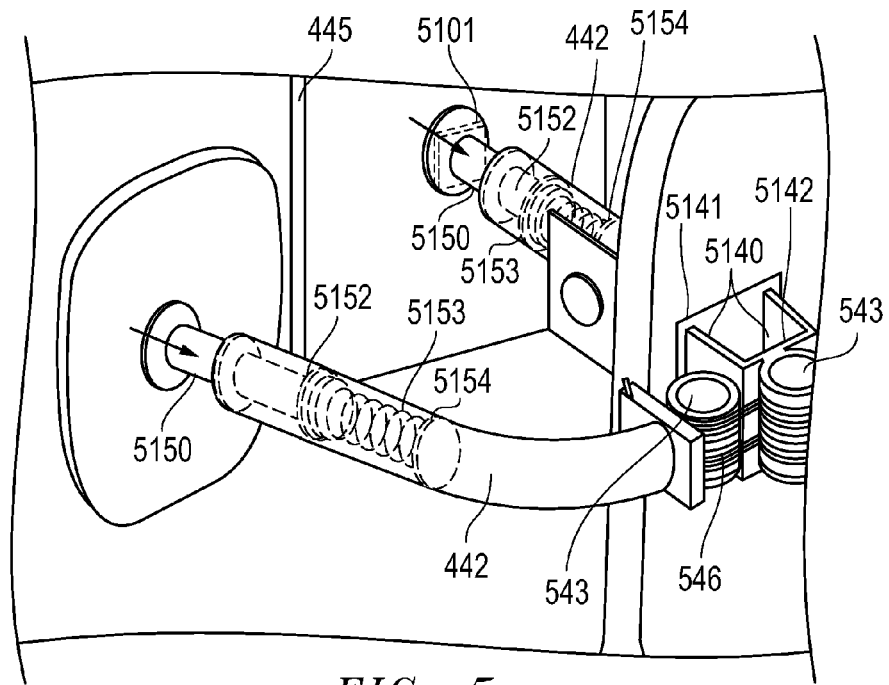
FIG. 5 illustrates a partial cutaway view of certain arms, pads and frame of an exemplary embodiment of a boxing apparatus (such as the embodiment of FIG. 4), according to certain embodiments of the invention.

Referring to FIG. 5, in conjunction with FIG. 4, the punching pads 445 and kicking pads 435 each contain or communicatively connect to one or more impact sensor 5101 (not visible in FIG. 4, but shown in FIG. 5 in phantom). The impact sensor 5101 can be any of a number of different types of impact or motion sensors (e.g., piezo sensors, contact switches, potentiometers, acoustical sensors, beam interruption sensors and so forth). In certain embodiments, the one or more sensor 5101 is each a respective three axis accelerometer. In addition, punching pads 445 and kicking pads 435 may include one or more light-emitting diode (LED) or other emitter that either emits a visible or audible signal or lights up or turns off according to what controller 461 or sensor 5101 directs it to do as to the respective pads 445, 435.

Each arm 442 has a cylindrical pivot point 543 and a rotational biasing means 546. When pad 445 is struck, for example, the force causes arm 442 to rotate/swing toward the rear of the apparatus 411 (as shown in the perspective of FIG. 4) and against the rotational bias of bias means 546. After the contact on pad 445, bias means 546 causes arm 442 to rotate/swing around pivot cylinder 543 back into the normal unbiased position. Rotational biasing means 546 can be a torsion spring or other bias device. Rotational biasing means 546 rests against stop 5140 which gives biasing means 546 and accordingly arm 442 some pre-tension.

Arm 442 and pivot point 543 are connected to upper frame 441 through housing 5142. In order to further minimize the rotational force on upper frame 441 (over and above rotational biasing means 546) there is a compressible attachment means 5141 between upper frame 441 and housing 5142. Compressible attachment means 5141 can a rubber block or similar shock dampener.

The back of pad 445 has a pad attachment means 5150 that connects pad 445 with arm 442 (pad attachment means 5150 can be an integral part of pad 445 or simply attached to the back of pad 445). In the embodiment shown in FIG. 4, attachment means 5150 is a cylindrical piston that slides into the interior diameter of arm 442. As pad 445 is struck, this force moves attachment means 5150 toward the back of the apparatus and into the hollow interior of arm 442. In order to cushion the force of the blow, the interior of arm 442 has two different force absorbing mechanisms. As pad attachment means 5150 moves backward into arm 442 it first hits solid compression material 5152 that compresses and absorbs some of the force of the blow. In addition, the material 5152 slides backward into compression spring 5153 that serves as another way to dampen the force of the blow to pad 445. Compression spring 5153 is forced back against stops 5154. In one embodiment compression spring 4153 is approximately about 4-6 inches long, although other lengths are possible depending on application.

In summary, as pad 445 is struck it moves backward through attachment means 5150 into arm 442. This force causes the various springs, foam and rubber compression materials to flex and then return to their original positions so that pad 445 is ready to be struck again. The swinging and compression motions are intended to approximate the feel that a user would have if they were hitting focus mitts held by a real life trainer. In other words the swinging and compression should approximate the types of motions one would have with the shoulders and elbows of a boxing or mixed martial arts (MMA) trainer during a training session.

The arm configuration (but not necessarily the angle of the pads) of arms 442 shown in FIGS. 4 and 5 for punching pads 445 may, but need not necessarily, be similar to the arm configuration for arms 432 used for lower kicking pads 435.

Figure 6:
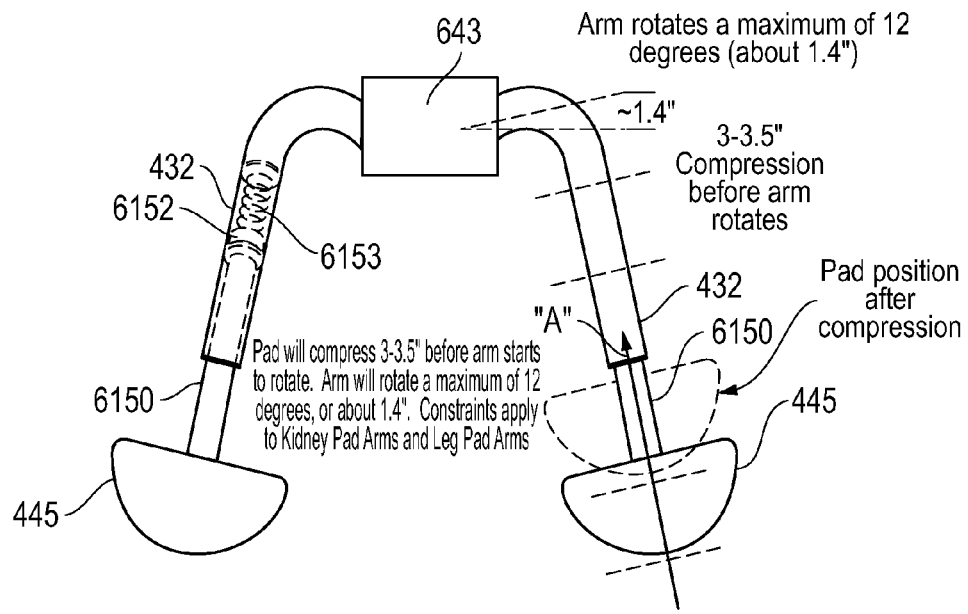
FIG. 6 illustrates a top view of an orientation of two arms and pads of an exemplary embodiment of a boxing apparatus (such as the embodiment of FIG. 4), according to certain embodiments of the invention.

Referring to FIG. 6, in conjunction with FIGS. 4 and 5, an exemplary embodiment of configuration for lower pads 435 (i.e. kidney pads and leg pads) and their corresponding pad arms 432 is similar to that of the upper pads 445. In particular in the embodiment, the pad attachment means 6150 (e.g., a piston) enters hollow arm 432 and impacts compression material 6152 and compression spring 6153 (similar to the compression material 5152 and compression spring 5153 shown in FIG. 5). On impact to the lower pad 435 (shown as arrow "A" in FIG. 6), the attachment means 6150 compresses material 6152 and spring 6153, for example, dependent on composition of the compression material 6152 and the compressive strength of the spring 6153 (e.g., bout 2.5 to about 4 inches, or more preferably about 3-3.5 inches), before arm 432 begins to rotate around a lower pivot point 643 (not shown in detail in FIG. 6), for example, similar to the pivot point 543 of the upper pads 445 and arms 442. According to a certain embodiment, the arm 42, for example, rotates a maximum of about 5-20 degrees (more preferably on the order of about 12 degrees, which in the particular embodiment corresponds to about 1.4 inches of movement).

Figure 7:
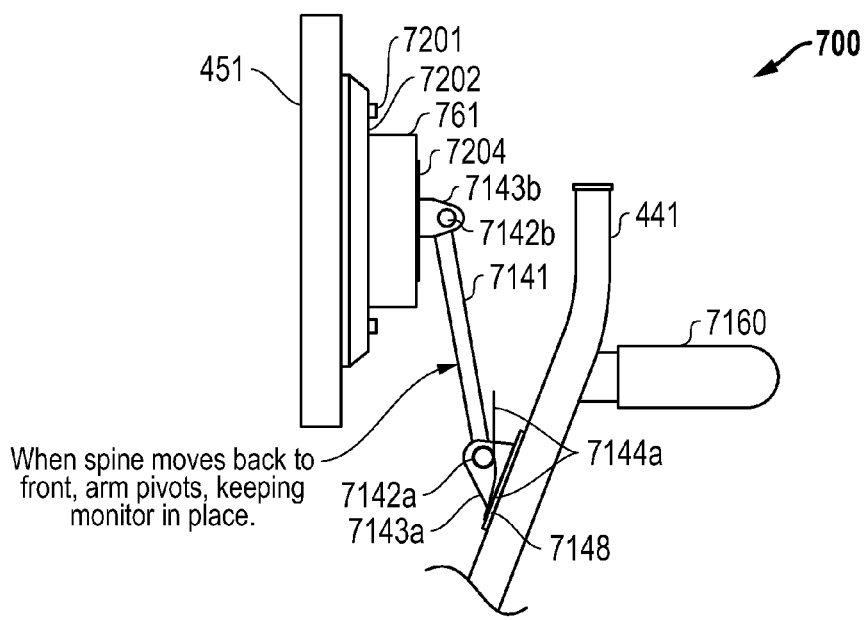
FIG. 7 illustrates a side view of a video assembly attached to a frame of an exemplary embodiment of a boxing apparatus (such as the embodiment of FIG. 4), according to certain embodiments of the invention.

Referring to FIG. 7, in conjunction with FIGS. 4-6, the video assembly 451 is attached to the upper frame 441 in certain exemplary embodiments. The video assembly 451 includes a visual display, for example, a liquid crystal display (LCD) (e.g., about 17-19 inches in viewing area, such as a Samsung SyncMaster 932 BW or other), another flat panel display, or other video display, and audio speakers 116 (shown in FIG. 1) (e.g., speakers integrated as part of the LCD display or separate from the display). The video assembly 451 may be capable of showing high definition images, video and graphics. Any of a number of different types of video/speaker assemblies may be included. The video and/or speaker, as applicable in the embodiment, is communicatively connected to the control unit 112, such as by wire or wireless link. Alternately, the display and/or speaker, as well as other peripheral device(s), can be separate from the upper frame 441, otherwise attached to or integrated with the frame or other portion of the boxing apparatus 411, or one or more peripheral device(s) communicatively connected to the control unit 461 of the boxing apparatus 411.

Referring to FIG. 7, in conjunction with FIGS. 4-6, an exemplary embodiment of an attachment mechanism 700 attaches the video assembly 451 to the upper frame member 441. This attachment mechanism 700 reduces movement and vibrations of the video assembly 451 when a user hits the boxing apparatus 411 (i.e., avoiding impact on the viewing experience from the video assembly 451). The attachment mechanism 700 can also reduce chance for a user to hit the video assembly 451 or damage it, if the video assembly 51 is mistakenly hit when the user is aiming at the upper "head" punching pads 445. A further possible configuration in the embodiment locates the video screen 451 behind the leading edge surface of upper head punching pads 45, for example, by about at least 8-12 inches, and more preferably about 10 inches behind the front edge of upper "head" pads 445 in a resting position, further limiting possibility of hit or damage to the video assembly 451. In certain alternatives, the video assembly 451 may be attached by a tilting device to allow tilt adjustment of the video assembly 451 with respect to the other portions of the apparatus 411.

Continuing to refer to FIG. 7, in conjunction with FIG. 4, according to an exemplary embodiment, a stabilizing arm 7141 is connected to the upper frame 441 by a pivot pin 7142a attached to a bracket 7143a. To minimize vibration from frame 441 to the bracket 7143a (and ultimately to video assembly 451), the bracket 7143a is attached to the frame 441 by an elastomeric damping material 7148. This material may be any of a number of different damping materials such as rubber, plastic, gels or a combination thereof and/or other materials. A bracket 7142b, pivot point 7142b and torsion spring 7144b (not shown in FIG. 7) may be also attach the other extent of the stabilizing arm 7141 with the video assembly 451, in a similar manner. An example of the torsion spring 7144a or 7144b is a 180 degree spring in slight tension due to the weight of video assembly 451, or other as desired for the configuration and requirements of use. Ends of the respective torsion spring 7144a,b rest on the inside of stabilizing arm 7141a, b and bracket 7143a,b, respectively. Upper frame 441 also, or in alternative, may have a handle 7160 connected to the upper frame 441, to raise and lower the telescoping upper frame 441.

Figure 8:
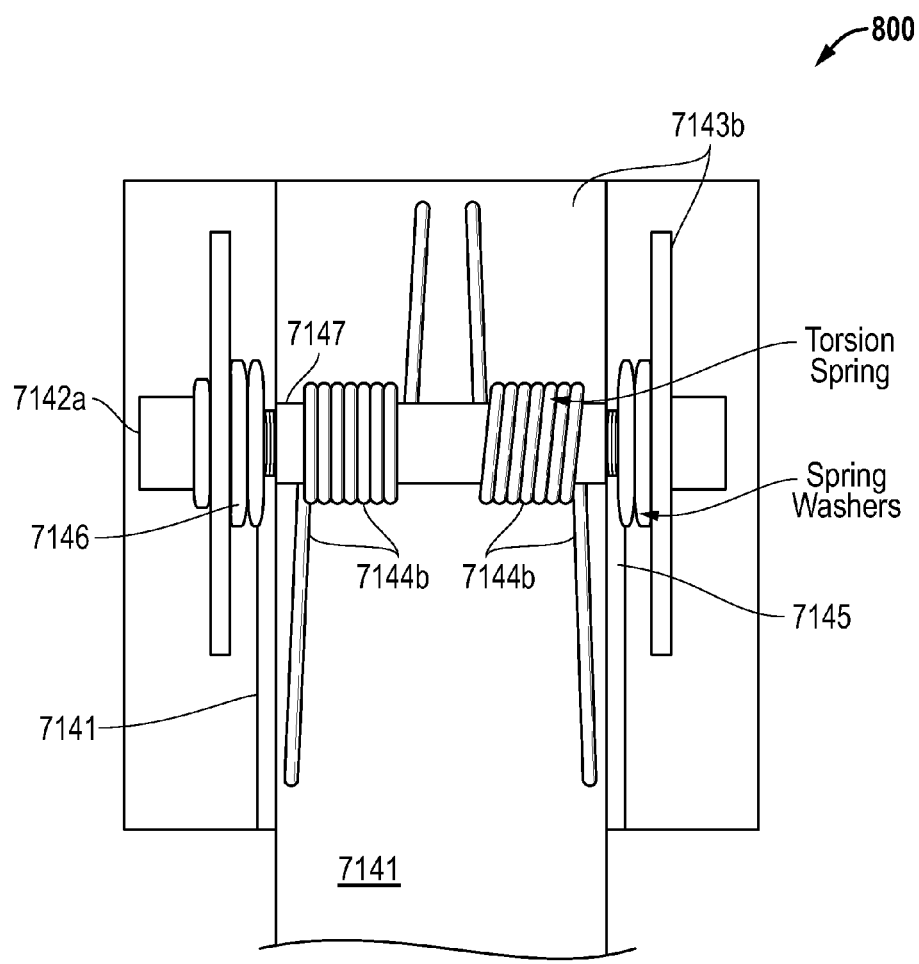
FIG. 8 illustrates a cutaway of a pivot point of an arm of an exemplary embodiment of a boxing apparatus (such as the embodiment of FIG. 4, according to certain embodiments of the invention.

Referring to FIG. 8, in conjunction with FIG. 7, an assembly 800 of the pivot point 7142b and bracket 7143b (as viewed from right side of FIG. 7 to left side of FIG. 7, as though standing to the right side of the illustration of FIG. 7 and gazing to the left) includes a bolt 7145 passed through the bracket 7143b. The bolt 145 acts to privotingly connect the stabilization arm 7141 to the bracket 7143b. The pivot point 7142b also comprises spring washers 7146 and a sleeve 7147 over which the tension spring 7144 fits. To prevent over rotation of the stabilization arm 7141, blocking means may, if desired, be included as part of pivot point 142 (not expressly shown). The pivot point 7142a, bracket 7143a and tension spring 7144a are similarly configure but with opposite orientation of the bracket 7142a in connection with the upper frame 141, with top-side and downside reversed and facing the upper frame 141 from opposite direction (in the view of FIG. 7).

Continuing to refer to FIG. 7, in conjunction with FIGS. 4-6, a back side (right side in the view of FIG. 7) of the video assembly (i.e., display or monitor) 451 includes one or more plate 7201 which is bolted or otherwise affixed to the video assembly 451. One or more rubber (or elastomeric) gasket 7202 is attached to the video assembly 451 to aid dampening of any vibrations to the video assembly 451. According to certain embodiments, a control unit 761 of the boxing apparatus 411 is attached to the gasket 7202 of the plate 7201. The bracket 7143b is attached to the control unit 761 and a second rubber (or elastomer) gasket 7204, with the gasket 7204 located between the control unit 761 and the bracket 7143b. The gaskets 7202 and 7204 can also dampen vibrations from frame 441 to the video assembly 451 (and the control unit 761, if located in such manner of FIG. 7). One embodiment as an example of the bracket 7143b is a VESA bracket welded or otherwise joined of attached to a bracket substantially similar to the bracket 7143a. Such a VESA bracket allows for standardization to fit many different makes and models of display. Although the various brackets, pivot points, tension springs and other aspects have been described, substitution, deletion or alternatives to those described are possible in the embodiments as will be apparent.

For example, although the control unit 761 is attached to the video assembly 451 in the embodiment of FIG. 7, the control unit 761 can alternately be attached to the boxing apparatus 411 at other locations or components, for example, to the upper frame 441, the lower frame 431, the base 421, or otherwise. Moreover, in other alternatives, the control unit 761 can be merely communicatively connected to the boxing apparatus 411 and residing physically apart from the boxing apparatus 411 as a unit. In such alternatives, communicative connection of sensors, display, and speaker, as well as other devices and peripheral units, can be by wired, wireless, infrared, BlueTooth™ or other components and technologies. Thus, the disclosed orientations and configurations of embodiments are intended to be merely illustrative and others are possible, as will be understood from the disclosure.

The control unit 761, whatever the communicative connection for the boxing apparatus 411 of the exemplary embodiments, substantially accords with the control unit 200 of FIG. 2. The control unit 761 includes, for example, one or more processor, memory, and output (and/or input) connections to any display or speaker. In alternatives, the control unit 761 may additionally have one or more controllers for connection to and control of the impact sensor(s) of the pad(s). In other alternatives, the control unit 761 may include other input and output connectors (I/O), data communication elements for external link of the boxing apparatus (such as a computer or other I/O port, a telephone (POTS) modem, and Ethernet controller, a radio for wireless connection, or others). In one example of alternatives, the control unit 761 includes components connecting to a network, for example, the Internet or another data or other communication network.

According to certain embodiments, the control unit 761 connects to and communicates with the video assembly 451, including speakers, to deliver to a user of the boxing apparatus 411 varied content (such as has been described, but also may include radio, television, web content, and other information) and interactive feedback while boxing or otherwise using the apparatus 411. Even further, the boxing apparatus 411, dependent on the particular control unit 761, video assembly 451, and other components or peripherals, provides great flexibility for different types of user experiences during use of the apparatus 411. For example, a variety of different types of content and information can be processed by the control unit 761, input and output or made available to the user through applicable I/O elements connected to the apparatus 411. Thus, the user is able to experience standard TV, including for example via a DVD or DVR player, a gaming machine, such as a computer or the Xbox 360™, Nintendo™ or Playstation™ consoles, or other media devices communicatively connected to the control unit 761 of the apparatus 411. In various embodiments and alternatives, media content is downloaded to the control unit 761, or to storage communicatively connected therewith, by DVDs, CDs, SD cards, flash drives, from the Internet, and/or other external source. Possible video, audio and other media used in or in connection with the apparatus 11 can be through simple implementation to the more complex implementation.

Figure 9A:
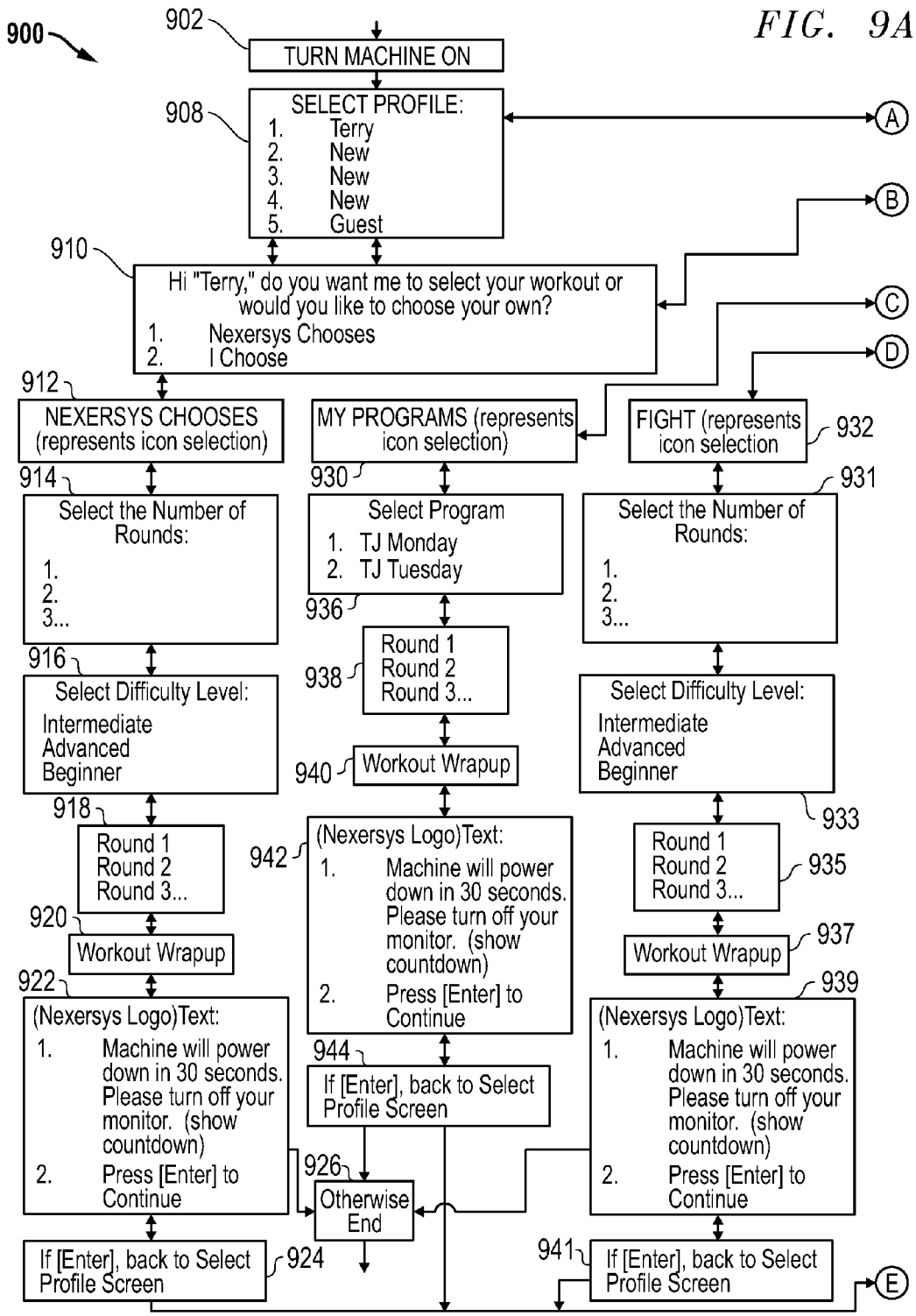
FIG. 9 illustrates an exemplary method of boxing by a boxing apparatus, according to certain embodiments of the invention.
Figure 9B:
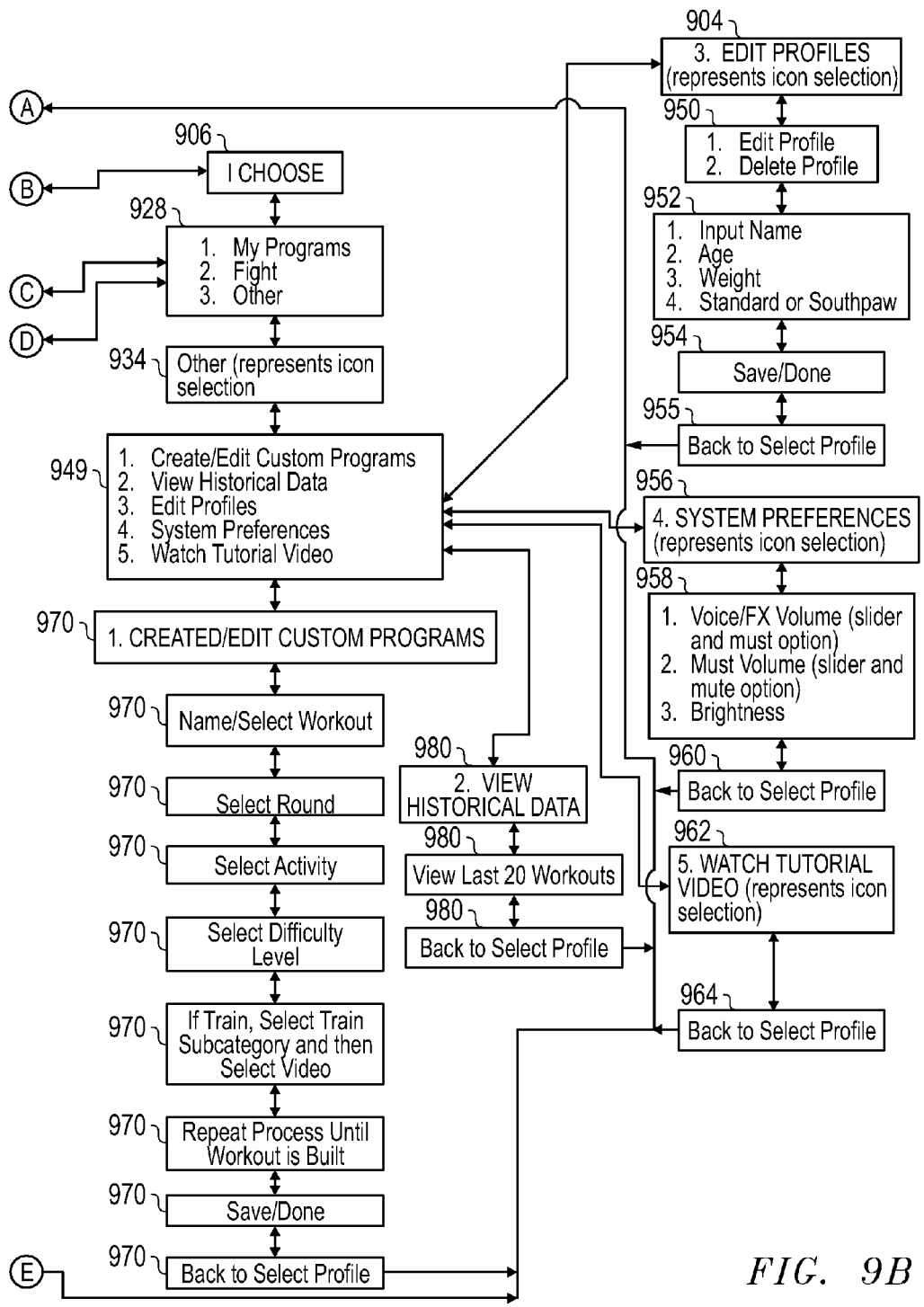

Referring to FIG. 9, in conjunction with FIGS. 4-8, an exemplary method 900 of operation of the boxing apparatus 411, and in particular of the control unit 761 and user interface for input and output of information, video and audio during boxing, commences with a step 902 of powering on the control unit 761. The control unit 761 boots via an operating system (for example, Unix™ or a variant, or other operating system software stored in a computer readable non-transitory memory of or connected to the control unit 761) and activates the video assembly 451 (as well as any speaker) to an on state.

Initially in the method 900, once the control unit 761 and the video assembly 451 are powered on (for example, by the user flipping a switch of the apparatus 411 to power "on" from "off" or, if already powered on, entry of a select indicator), the control unit 761 processes and directs display of an interface graphic in the step 908. The graphic may, for example, request input to the apparatus 411 in the step 908 to display in the video assembly 451 of identifiers for one or more user profile for the user. In response to the step 908, the user of the apparatus 411 may select one of the identifiers displayed in the video assembly 451, corresponding to any profile (previously input by the user) stored in a computer readable non-transitory memory or otherwise a guest profile or new profile (to be created by the user in a step 906 as later described). Each profile for the user is created in steps 904, 950, 952, 954, 955, 956, 958, and 960, responsive to the control unit 762 processing and directing display in the video assembly 451. Displays in the video assembly 451 during creation of profiles based on input by the user in the steps 949, 950, 952, 954, and 955, include create profile in a step 949, edit/delete profile in a step 950, input of relevant information for the user in a step 952, save in a step 954, to the apparatus 411. Other relevant information for use of the apparatus 411 by the user may include responsive input to displays of the video assembly 451, for example, selection of system preferences in a step 956 and system effects in a step 958. In each instance, the user's input to the apparatus 411 is by touch or tap of the pads. For example, any particular input is made upon detection by the impact sensor of the pad and signal by the impact sensor to the control unit 761 of such detection. According to particular pad touched or tapped by the user corresponding to the user's desired selection, the control unit 761 processes the detected touch or tap to the pad and thereby directs an applicable corresponding action, such as display by the video assembly 451 for successive steps of the method 900.

Once a profile is established by a user (and, in the case of a previously created profile, such profile is saved in storage by the apparatus 411), the method 900 proceeds with graphical display in the step 908 by the video assembly 451 for selection of indicator of the profile. In response to the step 908, a particular profile (from among one or more) is selected by user input to the apparatus 411. In making selection for input to the apparatus, for example, a user may touch or tap a correspondent punching pad 445 of the apparatus 411, which is detected by the impact sensor of the pad 445 and signaled to the control unit 761 as an indicator of the selected profile.

On input of the profile indicator in response to the step 908, the control unit 761 directs the video assembly 451 to display a next graphic interface in a step 910 for selection of system programmed boxing 912 of the apparatus 411 (e.g., type of workout, such as Fighting, Training, or another) and/or another operation or program of the apparatus 411 (i.e., such as the step 906, as later discussed). In response to the step 910, the control unit 761 may receive input by the user to the apparatus 411 corresponding to either selection of a next step 912 or step 906. If the step 912 is selected, for example, by user touch or tap to a punching pad 445 corresponding to a displayed identifier for the selection, an indicator of the selection is input to the control unit 761 and the control unit 761 processes and directs programmatic boxing 912 of the apparatus 411.

In successive steps 914 and 916 for the programmatic boxing 912, the control unit 761 directs the video assembly 451 to display subsequent graphics for selection of specific items for the programmatic boxing 912 with the apparatus 411. In the embodiment, a number for boxing rounds is input to the control unit 761 in the step 914 and a user level is input in the step 916. Each input is, for example, by user touch or tap to a corresponding punching pad 445 for the selection, detection of the touch or tap by pad's impact sensor, and directed input by the sensor to the control unit 761 for continued processing. Upon inputs as requested in the display, a step of boxing of the apparatus 411 commences in a step 918, through successive rounds per the number of rounds previously input.

Figure 10:
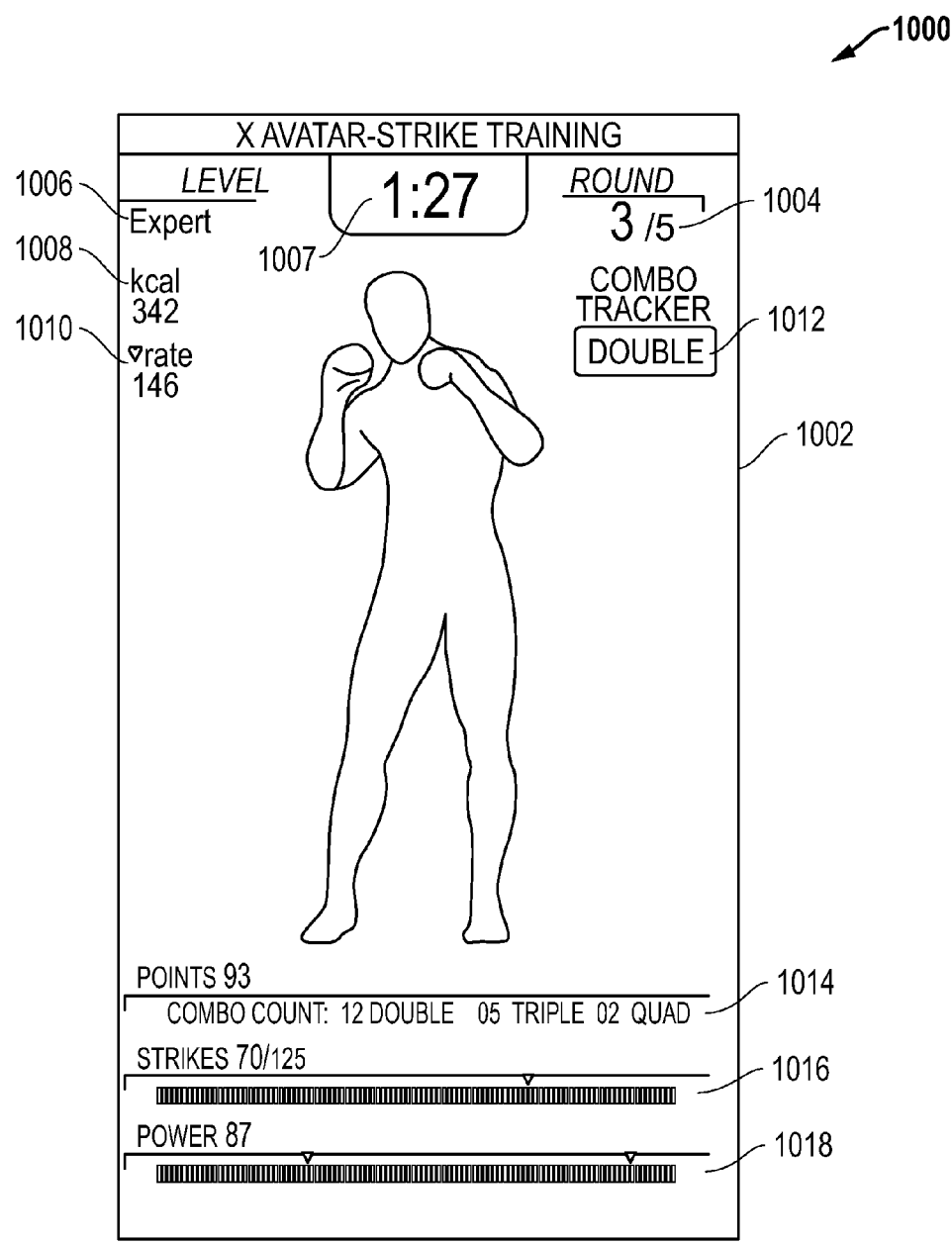
FIG. 10 illustrates an exemplary avatar fighter interface displayed by a video assembly of a boxing apparatus, in a fighting sequence, according to certain embodiments of the invention.

Referring to FIG. 10, in conjunction with FIG. 9, the control unit 761, during the boxing routine 918, processes inputs received from the impact sensors in response to punches and kicks of the user to the pad(s), and directs the video assembly 451 to display animated video graphics 1000 of an avatar fighter 1002 in the embodiment. Based on inputs of the user by punch and kick to respective pads 445, 435 and detection by the impact sensors and corresponding signal to the control unit 761, the avatar fighter's movement in display in the video assembly 451 is controlled by the control unit 761 to mimic a sparring partner's movement. The video graphics 1000 also display real-time information content, based on impact sensor detections processed by the control unit 761. In respect of the detections, the control unit 761 directs display by the video assembly 451, for example, of round identifier 1004, user-selected level identifier 1006, a timer 1107, a user's heart rate indicator 1008, a user's calories expended indicator 1010, a user's punch combination tracker 1012, a points scored summary 1014, a number of strikes tracker 1016, and a power of punch tracker 1018 displayed for each punch and kick to any respective one of the pad 106.

Referring back to FIG. 9, upon completion of the boxing 918 of the apparatus 411 (unless the step 918 of the boxing routine is interrupted by the user, such as by turning-off power to the apparatus 411 or the user's entry of an exit indicator to the control unit 761), the method 900 proceeds to a step 920 in which the control unit 761 directs the video assembly 451 to output a workout wrap-up result. A graphic interface processed and controlled by the control unit 761 is then directed for display by the video assembly 451 in a step 922 to allow responsive input from the user to continue using the apparatus 411 or otherwise the apparatus 411 powers down in a step 926. If input is received by the control unit 411 via the user's touch or tap selection of relevant pad to continue use of the apparatus 411, the method 900 returns to the step 908 of display on the video assembly 451 to select a profile.

As previously mentioned, after the step 908, the step 910 of the method 900 allows user-selection alternatively (instead of selection of step 912) of the step 906. In the step 906, the control unit 761 directs display in the video assembly 451 in a step 928 for selection by the user of either user-programmed training 930, user-programmed avatar fighting 932, or other action 934 of the apparatus 411 in the embodiment. If the user's responsive touch or tap selects user-programmed training in the step 928, the control unit 761 processes the user-programmed train or spar routine in a step 938. If the user, however, responds by touch or tap to select user-programmed avatar fighting 932, the control unit 761 directs the video assembly to display a number of rounds selection screen in a step 931, followed by a difficulty level selection screen in a step 933, and commences user-programmed avatar fighting in a step 935. A user's responsive selection in the step 928 of other options allows the user access in the steps 934 and 949 to customize routines and other operational features of the apparatus 761. For example, in a step 980 the control unit 761 directs display in the video assembly 451 of series of historical boxing information for the user and in a step 970 the control unit 761 directs display in the video assembly 451 of series of user programmatic selections for customized user-programmed train and avatar fight routines for user creation. As with other user-interaction with the apparatus 411, the impact sensors detect touch or tap of correspondent pad(s) for user selections, the control unit 761 receives indication from the impact sensors, and the control unit 761 processes next direction to the video assembly 451 accordingly.

If responsive to the step 928 the control unit 761 receives input from impact sensor for either the user-programmed training 930 or the user-programmed avatar fighting 932, rather than selection of other action 934, the apparatus 411, as directed by the control unit 761, commences the corresponding step 930 or the step 932. In the step 932 in respect of a previous user-initiated avatar fighting routine input and saved by the apparatus 411, the method 900 proceeds with a step 931 in which the control unit 461 directs display by the video assembly 451 for selection by the user of number of rounds for the avatar fight. A step 933 follows a responsive input (by the user via touch or tap of a select one of the pads) of a particular identifier for a number of rounds from among displayed choices. In the step 933, the control unit 761 directs display in the video assembly 451 for selection of a difficulty level for the avatar fight. Boxing with the avatar fighter in a step 935 then proceeds for the apparatus 411, through successive rounds (if more than one). During the step of boxing 935, the control unit 761 directs display in the video assembly 451 of sequences similar to those of FIG. 10.

If in the step 928 the user's response is selection of a user-programmed routine for processing by the control unit 761 of user-programmed training 930 in the apparatus 411 of the embodiment (i.e., rather than user-programmed avatar fighting 932), the method 900 proceeds with a step 936 in which the control unit 761 directs display in the video assembly 451 of a program item selection screen. Responsive to selection of a program item by the user, the impact sensors detect the touch or tap selection to the pads and the control unit 761 processes the applicable user-programmed train routine in a step 938.

Figure 11:
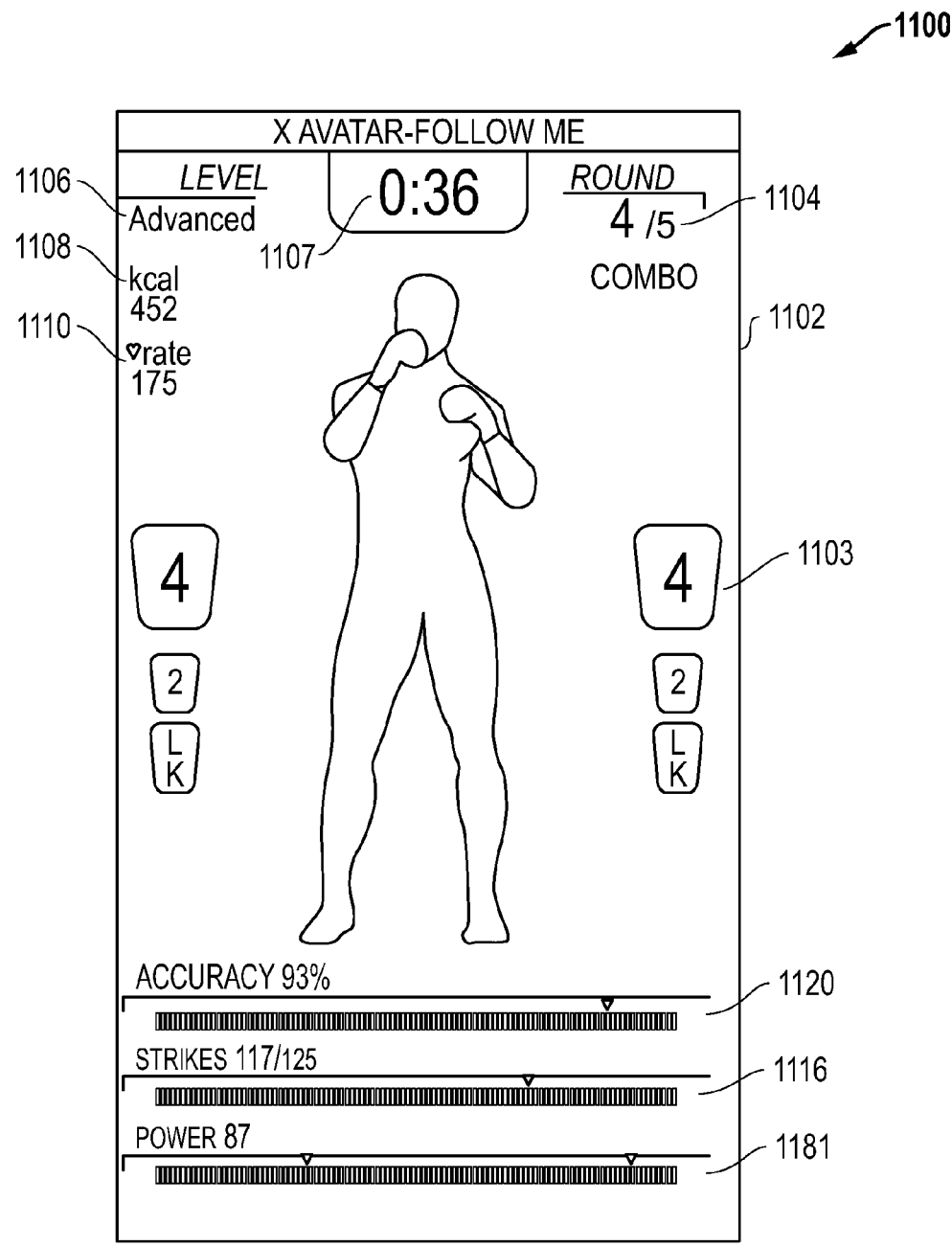
FIG. 11 illustrates an exemplary graphic pad layout and avatar fighter interface displayed by a video assembly of a boxing apparatus, in a training sequence, according to certain embodiments of the invention.

Referring to FIG. 11, in conjunction with FIG. 9, in an example of operation of the apparatus 411 in processing a user-created routine of boxing 938, the control unit 761, during the boxing routine 938, directs the video assembly 451 to display animated video graphics 1100 of an avatar fighter 1102 and a graphic portrait 1103 of relative locational arrangement of the pads of the apparatus 411. This graphic portrait 1103 automatedly leads the user through sequences of punches and strikes to the pads. As a pad or series of pads is highlighted in the graphic portrait 1103 during processing of the boxing routine 938, the user can respond by punches and strikes in efforts to follow the order of sequences displayed. The animated video graphics 1100 also display real-time content, including, for example, round identifier 1104, level identifier 1106, a user's heart rate indicator 1108, a user's caloric expenditure indicator 1110, a number of strikes tracker 1116, a power of punch tracker 1118, and an accuracy of punch (including correct pad as well as punch response timing) tracker 1120. Additionally, a fighter avatar 1102 of the animated video graphics 1110 can portray a location of punch to the avatar 1102 conforming to the pad punched or kicked.

Continuing to refer to FIG. 9, upon completion of processing of the boxing routine by the control unit 761, upon completion of the user-programmed avatar fighting 932 or of the user-programmed training 930 of the apparatus 411, the method 900 proceeds to either step 937 or step 940, respectively, in which the control unit 761 directs the video assembly 451 to output a respective workout wrap-up result. A graphic interface processed and controlled by the control unit 761 is then directed for display by the video assembly 451 in step 939 or 942, respectively, to allow responsive input from the user to continue using the apparatus 411 or otherwise the apparatus 411 powers down in a step 926. If input is received in the step 941 or 944, respectively, by the control unit 411 via the user's touch or tap selection of relevant pad to continue use of the apparatus 411, the method 900 returns to the step 908 of display on the video assembly 451 to select a profile.

In an exemplary embodiment, for example, the control unit 761 and video assembly 451 (with incorporated speaker) are employed by the user as a teaching tool. For example, the apparatus 411 outputs a standard (or customized) video that may teach a user how to punch and kick by watching a professional in the video.

In another embodiment the content played on video assembly 451 may be used as a motivational tool used to spur on a user to exercise harder and follow what the instructor on the video is doing (e.g. the type of exercise video first made popular by Jane Fonda). This motivational video content might not even be directly associated with boxing apparatus 411. For example it might be a video urging a user to jump rope for a certain period of time or stretch. The teaching and motivational exercise may be combined in content such that, for example, the video urges on the user to jump rope for 60 seconds and it may also help teach them proper technique by showing proper jump roping on video assembly 451.

While video assembly 451 can be used with control unit 761 as a standalone teaching and/or motivational exercise tool, the primary use of apparatus 411 is as a interactive tool for people using it in a boxing or martial arts mode. In this mode the user is both watching and listening to video assembly 451 while also punching or kicking the mechanical portions of apparatus 411. In order for apparatus 411 to be interactive and give a user feedback on how they are doing, control unit 761 is also in communication with impact sensors 110 embedded in the punching units 445 or kicking units 435. The communication between sensors 110 and control unit 761 can be hard wiring or wireless connection, or other present or future communicative connection.

As a punching pad 445 is struck it moves and impact sensor 110 senses this impact or movement and communicates the impact to control unit 761. Control unit 761 is capable of processing the communicated impact in a wide variety of ways to display in the video assembly 451, store, or otherwise respond in the apparatus 411. For example, the control unit 761 may record in storage which of the punching pads was struck and when the impact occurred. Also, it may record in storage how hard the pad or pads were struck. The control unit 61 performs these tasks for all the various punching pads and kicking pads and thus has records of what the user did during a training or exercise routine (earlier sessions may also be stored in control unit 761 and, if so, workout or training trends and history may be analyzed and shared with the user via output of the apparatus 451, such as display in the video assembly 451). The information recorded and analyzed by the control unit 761 can then be fed back to the user through video assembly 451 or even shared with a separate personal computer, personal digital assistant (PDA), cell phone or other processing device of the users. For example during a particular session the user might know that they had made 11 left punches to the head, 3 rights to the head, 14 rights to the body, 9 lefts to the body and 3 upper cuts. The feedback might also let the user know that toward the end of the routine his punches were getting progressively weaker and/or that the punches were coming at a slower rate toward the end of the session.

In training or exercise routines where the user is following directions on punching or kicking from the video assembly 451, it may be desirable for the impacts on the punching pads to be time stamped and then compared (i.e. synchronized) to the video directions to see how a user is doing. In this embodiment, the video instructions to the user may be in the form of an avatar on video assembly 451. The avatar may have visual clues telling the user which pads to hit on the machine. For example, the left side of the avatars head may light up and show the user that they need to throw a right hand jab to the head. If the jab is done quickly enough after the signal to punch has been given then this may score points for the user. The avatar may be used as a "score keeper" of sorts as the avatar changes appearance as punches are thrown. For example the avatar may begin to slump or groan (audible clue) or portions of the avatars body may change color as pads 45 are struck. As just an in exhaustive example, when a user has hit a particular pad 45 enough times in a round, the corresponding section of the avatar might turn a red color to show that the user doesn't need to hit that pad anymore (during the series of strikes prior to the red color the avatar's body in this particular area might be gradually changing from a green color to a yellow to an orange and then finally to red).

In this interactive mode, the control unit 761 processingly compares the video instructions to see what the user physically did to the punching pads at that approximate point in time. If the punch was too slow after the direction from the video to punch a particular pad 445 that delay can be noted by control unit 761. Likewise, if the punch was to the wrong pad that can also be noted by the control unit 761. In fact, in either of the cases above a punch that is too slow or to the wrong pad the feedback might also come in the immediate form of a sound from video assembly 451 (e.g a bong sound that the wrong pad was struck). According to certain embodiments, LED lights (not shown in detail in the Figures) integrated to the striking surface of the pad may either light up or fail to light up to show a user how they are doing in real time. When an avatar is shown in the video assembly 451 the avatar can have lights and/or sounds that give feedback to the user.

The control unit 761 may support and allow a user selection from among different levels of difficulty for training and fighting. These different levels are likely to have different standards for reaction time, power of the punches and so forth. For example, once the signal has been given to hit upper left hand pad 445 a beginner might have 1 second to hit that particular pad while an expert might have only half a second to hit the right pad in order to have a successful punch.

For some users and in some types of sessions in use and operation of the apparatus 411, real time feedback may not be desirable. Therefore, apparatus 411 can also have storage for containing data from a routine. In such instance, the control unit 761 may at later time or date process and analyze data of the routine, such as at the end of processing of the routine and then give the user summary feedback. Video assembly 451 could also inform a user either visually (using charts, graphs or simple data) or audibly of added content and information, via processing by the control unit 761 and directed display in the video assembly, of items such as, for example, how the user performed during the session, that during the latest 3 minutes or other particular period of the workout the user hit a particular percentage (e.g., 91%) of particular pad or pads (for example, the right pads) within the expected time per the difficulty level or routine, average numbers or statistics relevant to force, sequence, and/or accuracy of punches (e.g., that the force of punches was an average of a 4 on a scale of 5), and other processed indicia. Details such as which of punches (e.g. a right jab) is least accurate or most late may also be processed by the control unit 761 and displayed or otherwise given to the user. Some users may desire to have both real time feedback (e.g., sounds and lights during the routine) and summary feedback at the end. When giving real time feedback, the control unit 761 may, for example, control the video assembly 451 to display recent or historic performance of the user through various graphs, charts or the like (e.g., by a rolling bar displayed in the video assembly 451, showing in real time punches versus direction through processing of routine by the control unit 761 for display of instructions to the user as to action and respective reaction to the instructions). In the case of such graphs, charts or the like, the control unit 761 may direct display in the video assembly 451 of color coding for the different punches and the users success or failure. An example of a rolling bar display for such content in video assembly 451 might be similar to that of the computer game "Guitar Hero" except displaying punches and punch sequences to a fighter avatar or pad arrangement as opposed to musical notes.

In various alternative embodiments, the fighter avatar is controllingly directed by the control unit 761 to display in the video assembly 451 as bobbing and weaving like a boxing opponent and/or throwing punches back toward the user (e.g., 3-D effects and like can also be possible for the avatar in certain alternatives). In embodiments providing avatar display in a moving scenario, for example, the avatar may throw a "haymaker" or "round house" punch to the user and the user may score extra points if a number of combination punches to the body of the avatar is hit or returned. The control unit 761 additionally may store and provide display of records of punching combinations and give feedback or rewards (e.g. a higher score) based upon the user combinations. In certain embodiments, the avatar, as controlled by processing of the control unit 761, may synchronize motions in response to the user's punches and strikes and deliver offensive motions to the user, such as in an actual fight scenario. In further embodiments, location sensors (similar to location sensors in hands free hygiene apparatuses or otherwise) may be attached to the user's hands to keep track of the location of the user and to provide automated input to the control unit 761 for use in processing and display. In such an embodiment, for example, if the user does not duck when the avatar is throwing a punch at the user's head, the control unit 761 may record the failure to move out of the way as a strike by the avatar and result in a commensurate reduction of points from the user or addition of points to the avatar. Various game implementations of the apparatus 411 and its operations and use are, thus, possible and included for purposes of this disclosure.

In certain embodiments, a user may spar with another user of the apparatus 411 from a remote location. In such embodiments, the avatar on user A's screen may mimic the actual motion of user B on the remote apparatus 411. For example, the Internet or other network connection provides communication between respective apparatuses 411 at the locations. In such example, respective apparatuses 411 can in various embodiments include location sensors (not expressly shown) and/or video camera elements (not expressly shown) for displays of respective user sparring partners in the respective video assembly assembly 451. A user may thereby virtually fight a remote friend and even have the respective control units 761 of the apparatuses 411 track how each respective user is doing vis-à-vis his remote opponent.

In certain embodiments making the apparatus 411 as flexible as possible for a wide variety of uses, the control unit 761 can be designed to process wide variations of software and content, including, for example, network downloadable or user uploadable software and content. For example, if a user wants to do 3 minutes of warm up before then doing a 3 minutes training session on how to jab, the user should be able to simply and easily tell the controller what they want to do through an interface of the control unit 761, for example, an interface directed by the control unit 761 for display in the video assembly 451 and responsive to detection of touch, tap, punch and strike to pads by impact sensors connected to the control unit 761. In examples of such interface in the apparatus 411, the user may be able to pick and choose from among various sessions in an a la carte fashion or choose popular menus of various sessions that have been prearranged and run/processed by the apparatus 411 automatically from storage or other source. Moreover, users may be able to design (and store within control unit 761) various menus of sessions, such as prearranged personally by the users for the interface in connection with work out or training session of their own design.

According to certain embodiments, communicative connection of the apparatus 411 to a communication network, such as, for example, the Internet, a local area network, some other wide area network, peer-to-peer connection, or other connection between and/or among apparatuses 411, can provide user sharing of routines, menu arrangements, user-created software, user/community communication, and other sharing and community aspects of use, devices, operations, and other features of the apparatuses, methods and embodiments. According to certain embodiments, for example, a user community of communicatively connected apparatuses may be operated by a central authority or a user (e.g., by subscription or otherwise); users may share information relative to the apparatuses, methods and embodiments through wireless, wired and other communicative connections; communicative connections of the apparatus can allow a user to connect to and make available to other devices various information, games, routines, results, and the like; and a wide variety of other options and devices may be used on, in or in connection with embodiments.

Because many users of the embodiments will be wearing boxing gloves and will not be able to type, punch small buttons or use a touch screen, certain embodiments enable the user to move one or more of the punching pads (even with their gloves on) and have these gross movements of the pad signal the control unit 761 of user selections and other inputs for processing. For example, tapping on one of the pads 445 brings up a user interface screen on video assembly 451 and the user navigates around this user screen using gross movements on pad 445. In certain embodiments, the impact sensor 101 for each pad is a three axis accelerometer that senses movement in various spatial directions. For input to the control unit 761, the user can "click" on a displayed interface or otherwise by touching or tapping a relevant pad on a link or selection of interest. In other alternatives, the control unit 761 includes elements for speech capture and recognition and is responsive to a user's voice via such elements. Such voice-enabled alternatives of the control unit 761 can also allow disparate but communicatively connected devices and methods to operate in or on the embodiments of the apparatus and method.

In certain further embodiments, as previously mentioned, the control unit 761 includes elements and connections for Internet communications. In such Internet-enabled embodiments, the apparatus 100, 411 is useable for interactive games, for example, where a user at one location "spars" with a user at a different location. These example interactive games would be greatly more desirable than "shadow boxing" an opponent with a joy stick or a Wii™ type apparatus with a computer or processor device. Interactive "on-line" fighting via the embodiments could be accompanied by scores that allow a user to compare his score with those another person score on a real time basis (or a delayed basis, according to applicable embodiment or user selections). Unlike other games which do not require proper boxing or MMA techniques, the embodiments can require that the user strike the pads with proper technique in order to obtain maximum score. For example, if the user strikes too easily or too hard, or if the user doesn't use the preferred combinations as directed by the control unit 761 in the video display 451 or according to proper techniques, the score of the user is not maximized. Such combinations of striking, combination scoring, power monitoring and reactions to what the avatar (or remote party, etc.) is doing can all combine to help teach and train a user how to box most effectively. If the user is not boxing effectively, the control unit 761 can process stored or communicated instructional media, information, or other content, for display in the video assembly 411, such as to explain to the user what he needs to do in the future to perform better.

Figure 12:
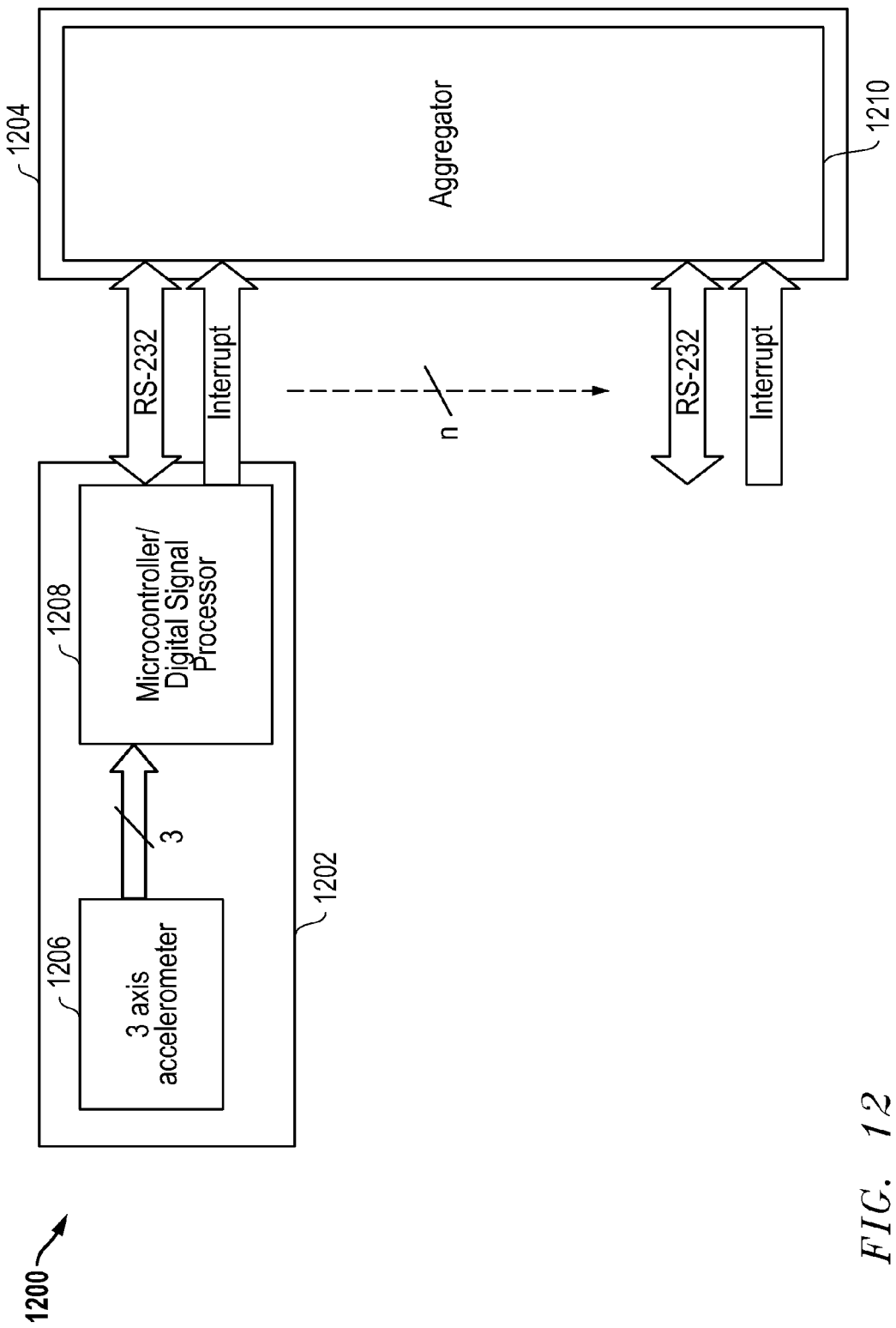
FIG. 12 illustrates an exemplary sensor device of a boxing apparatus, according to certain embodiments of the invention.

Referring to FIG. 12, a system 1200 for detecting contact, such as a tap, strike or punch, includes an accelerometer unit 1202 communicatively connected to an aggregator unit 1204. The accelerometer unit 1202 includes an accelerometer 1206 communicatively connected to a signal processor 1208. The aggregator unit 1204 includes an aggregator device 1210, which includes or is communicatively connected to a processor (not shown in detail).

The accelerometer 1206 is, for example, a 3-axis accelerometer for detecting three dimensions of movement (e.g., X, Y and Z axes, respectively). The accelerometer 1206 can alternately be single-axis or multi-axis of other number of dimensions, and the 3-axis accelerometer is merely an example for purposes of discussion. The signal processor 1208 is any of a wide variety of processor device, such as a microcontroller, digital signal processor, or other processor, capable of processing measurements in the three (or other number of) dimensions made by the accelerometer 1206. The accelerometer unit 1202 can be unitized, such as a single printed circuit board including the accelerometer 1206 and the signal processor 1208, or may be implemented in separate units, other segregation of components, or any combination of units, features of units or components.

The aggregator device 1210 of the aggregator unit 1204 includes memory and a processor (not shown in detail). The aggregator device 1210 is, for example, a microcontroller chip unit including a processor, random access memory, read only memory, clock and input/output control unit. Although the aggregator device 1210 can be unitized as a single chip or unit, it may alternately be implemented in communicatively connected separate components, units of various components, or combinations.

In operation, the accelerometer 1206 measures axial acceleration, in three dimensions (X, Y, and Z) in the example. Measurements are sampled at successive time intervals, for example, about each 1 ms or as otherwise desired by design or for the application. Each measurement made by the accelerometer 1206 includes three axis values in the example of the 3-axis accelerometer, and this measurement is communicated to the signal processor 1208.

If measurement by the accelerometer 1206 exceeds a minimum threshold, for example, sufficient to indicate a strike moving the accelerometer 1206, the signal processor 1208 commences calculating the root mean square of the three axis values for each measurement of the accelerometer 1206, to obtain a vector sum magnitude. The signal processor 1208 continues this calculating with each next measurement of the accelerometer 1206 received by the signal processor 1208. As the signal processor 1208 receives measurements and performs root mean square calculations, the signal processor 1208 also commences integrating the vector sum magnitude. The result of integrating is reflects the merit or force of movement/acceleration, for example, such as may be caused by the strike, because relative to magnitude and duration of acceleration measured by the accelerometer 1206. The signal processor 1208 also determines one of the axes measured as dominant for the movement/acceleration, such as the dominant axial direction of the strike. For the dominant axis so determined, the signal processor 1208 integrates the result of integration of the vector sum magnitude to calculate a velocity for the dominant axis. The signal processor 1208 continues the calculating and integrating of measurements from the accelerometer 1206, until the dominant axis velocity integral drops below a lower threshold value.

When the lower threshold value is met, the signal processor 1208 communicates an interrupt request (IRQ) to the aggregator device 1210. The aggregator device 1210 time stamps the interrupt request, and requests and receives from the signal processor 1208 data representing the dominant axis velocity integral and identity of dominant axis. The aggregator device 1210 stores data representing this integral and axis in a non-transitory memory of the aggregator device 1208 (or, alternately, of memory communicatively connected to the aggregator device 1208, as applicable).

Figure 13:
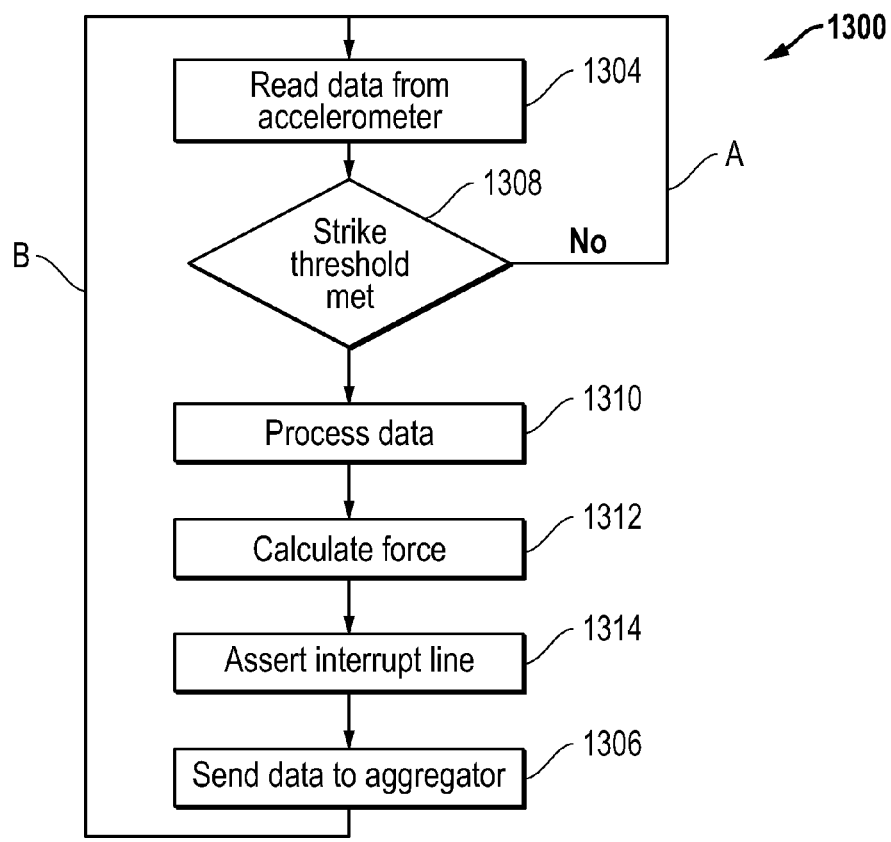
FIG. 13 illustrates a method of detecting a strike or touch to a pad of a boxing apparatus, according to certain embodiments of the invention.

Referring to FIG. 13, in conjunction with FIG. 12, a method 1300 of strike detection to a pad incorporated with an accelerometer, such as performed, for example, by the signal processor 1208, includes a step of reading 1304 strike data received from an accelerometer. The step of reading 1304 may be commenced, as previously mentioned, on receipt of an interrupt from the accelerometer, and includes a request and receipt of data representing accelerometer axial measurements upon a strike to the pad. In a step 1308, determination is made whether received data meets a threshold.

If the threshold is not met, the method 1300 returns to the step of reading 1304. If, however, determination in the step 1308 is that the threshold is met, a step of processing 1310 the root mean square of data representing the accelerometer axial measurements proceeds to obtain a vector sum magnitude corresponding to the measurements. This step of processing 1310 continues for each next set of data representing accelerometer axial measurements, for example, throughout the strike detected by the accelerometer (e.g., until a threshold is met, such as for the axis velocity integral previously mentioned).

In a step of calculating force 1312, each set of results of the step of processing 1310 is integrated to obtain a measured merit for the strike, a dominant dimensional axis of the strike, and highest magnitude of the acceleration. The measured merit for the strike relates to the magnitude and duration of acceleration as detected by the accelerometer for the period of the strike from commencement (on meeting one threshold) and on end (on meeting another threshold). Further in the step 1312, acceleration for the dominant axis of the strike is integrated to obtain velocity for the axis and strike.

In a step 1314, an interrupt line is asserted when the dominant axis velocity integral in the step 1312 drops below the end threshold, as set for measuring the strike. Upon asserting the interrupt line 1314, data from the step of calculating force 1312 is sent to an aggregator for logging and further handling. This data represents, for example, a time of the strike, an identity of a pad of the strike, a measured merit of the strike in the nature of a relative force of the strike, and the dominant dimensional axis of the strike indicative of strike direction. Other, additional or alternative calculations and data representing the strike or strike attributes may be performed in the method 1300, as will be appreciated from the foregoing. For example, force and resistance constants, such as of mechanical features like springs or joints, processed mathematical models, or other detection and measurement may, in certain alternatives, be employed in the method 1300 for measuring force, direction, duration, and the like.

In use of the embodiments of FIGS. 12-13 in a boxing apparatus of the embodiments, each one or more pad of the boxing apparatus (as to which strikes are to be measured) includes a particular one of the accelerometer unit 1202. Each accelerometer unit 1202, if one or more each incorporated in particular pads, is communicatively connected to the aggregator unit 1204. In certain examples, each accelerometer unit 1202 is a small printed circuit board including the accelerometer device 1206 and the signal processor 1208 and the aggregator unit 1204 is same for all one or more accelerometer unit 1202 for respective pads. The aggregator unit 1204, for example, is included in a control unit for the boxing apparatus of the embodiments, or can be included or incorporated in other components or functional devices of the control unit, in one or more printed circuit board connected to other elements of the control unit, or in other segregations or combinations.

Each accelerometer unit 1202 independently measures and calculates data representing strikes to one or more pad to which the accelerometer unit 1202 is integrated or connected. Where more than one accelerometer unit 1202, such as when multiple pads of the boxing apparatus, each accelerometer unit 1202 detects a strike to the particular pad to which associated, and delivers data representing the strike to the aggregator unit 1204. The aggregator 1210, as previously stated, logs the strike (i.e., data representing the strike) together with the timestamp per the interrupt request and orderly stores these in memory (of the aggregator 1210, if applicable, or otherwise communicatively connected to the aggregator 1210). Successive strikes are logged in the order in which interrupts are received by the aggregator 1210 and corresponding to the particular pad of the strike.

Figure 14:
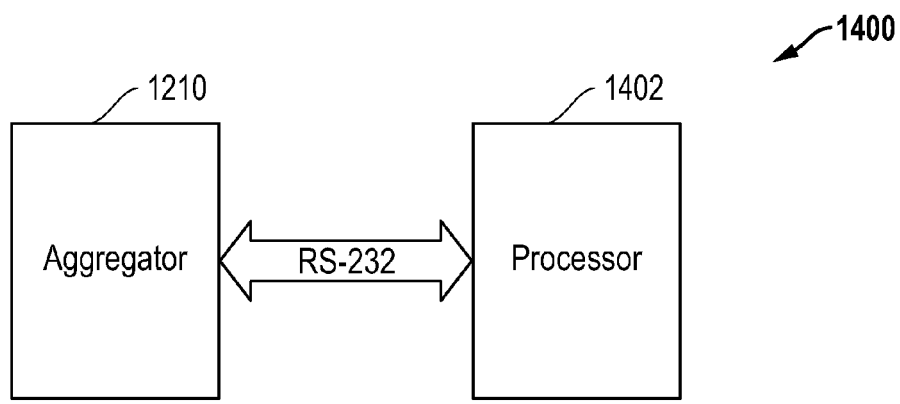
FIG. 14 illustrates an example of a control unit of a boxing apparatus, including an aggregator and processor, according to certain embodiments of the invention.

Referring to FIG. 14, in conjunction with FIGS. 12 and 13, the aggregator 1210 is communicatively connected to a processor 1402, for example, a control unit 1400 of a boxing apparatus according to embodiments, for controlling reporting, display, and other output, as well as storage of data representing user actions and activities using the boxing apparatus in a non-transitory tangible media or other medium. After a particular time interval for the log entry of the aggregator 1210, the aggregator 1210 communicates the log entry to a control unit, such as a processor and other devices, of the boxing apparatus. The control unit, as described with respect to embodiments, employs data of the log entry for reporting output to the user, for example, strike accuracy, number power and other boxing and training output in a display of the boxing apparatus. Additionally, the boxing apparatus may store such reported output for the user, such as to allow tracking of progress and the like.

An example according to certain embodiments is now described.

Accelerometer Data Acquisition:
Bandwidth of accelerometer signal, sampling rate (e.g., 1 ms intervals or other time periods), and particular axes sampled (e.g., X, Y, Z axes in the case of a 3-axis accelerometer) are set as desired for the operations in accordance with accelerometer capabilities Sampled raw data of the accelerometer is low-pass filtered to reduce effect of noise, for example, using a 4-point rolling average filter Calculations are made for each axis (e.g., 3-axes, to wit, X, Y and Z) after the data of each sample is demodulated, as follows:

$X'=(x0+x1+x2+x3)/4$

Where $X0$ is the oldest raw data and $X3$ is the newest raw data. After this calculation, $X'$ is stored in a large data buffer and $X0$ it discarded.

A next raw data ($X4$) is then sampled at a later designated time interval (e.g., sampling at 1 ms intervals)

Calculations are then made for each axis as follows:

$X''=(x1+x2+x3+x4)/4$

Where $X1$ is the oldest raw data and $X3$ is the newest raw data. After this calculation $X''$ is stored in the data buffer and $X1$ is discarded.

Subsequent sampling and calculations continue for each accelerometer. If there is more than one pad of the boxing apparatus, and each pad includes an accelerometer, the data acquisition continues in similar manner with respect to each accelerometer.

Strike Detection:

A respective acceleration vector sum of the X, Y, and Z axis acceleration data sampled by a respective accelerometer is calculated, for example, by a signal processor of an accelerometer unit, as the root mean square of the axis acceleration data. If the vector sum exceeds a pre-determined threshold, a strike is deemed detected for the particular accelerometer and corresponding pad of the boxing apparatus. Sampling continues, and sampled data is smoothed and vector sum calculated and stored, until the vector sum falls below a second pre-determined threshold. At this point a strike metric calculation is performed.

Strike Metric Calculation:

The time period of the strike, and consequently of sampling and calculation of sampled strike data measured by the accelerometer as acceleration vectors along the applicable axes, commences at the time the vector sum exceeds the first threshold and ends at the time the vector sum falls below the second threshold. Calculations are performed for the sampled data, for example, by a signal processor of an accelerometer unit.

A peak magnitude (i.e., Acceleration Peak) of the vector sum is determined from the respective vector sums calculated.

A direction of the vector at the Acceleration Peak is calculated and saved as the azimuth and the inclination.

The azimuth is calculated from Z and Y axis data. Z is positive acceleration when the pad is hit in or out. Y has positive acceleration when the pad is hit left to right.

0 deg is when there is positive Z acceleration with a Y acceleration value of 0

90 deg is when Z acceleration is 0 and Y acceleration is positive 180 deg is pad acceleration in the Z-axis of the pad returning to a position at which normally disposed by the frame of the boxing apparatus when not punched, and Y acceleration is zero Inclination is the angle formed by the X and Z axes.

0 deg is when the X acceleration is positive and the Z acceleration is 0

90 deg is when the X acceleration is zero and the Z acceleration is positive 190 deg is when the X acceleration is negative and the Z acceleration is zero The vector sums from samples by the accelerometer during the time period of the strike (i.e., between first and second threshold) are then integrated to obtain a maximum velocity of the strike (i.e., Total Energy), which has relation to the total energy transferred to the pad by the strike. Each vector sum that was calculated is multiplied by the interval of the sample period (e.g., 1 ms or other interval), and each product of that multiplication is summed as a measure of total work for the strike (i.e., Total Work). The following strike metrics are then communicated to an aggregator for the metrics: Acceleration Peak, Direction, Total Work, and Total Energy.

Strike Aggregator:

The aggregator monitors interrupt request lines (IRQ) from each accelerometer of each pad of the boxing apparatus for which strikes are detected. When an IRQ line is asserted, a timestamp is logged by the aggregator. The aggregator then requests the strike metrics data from the applicable accelerometer unit of the stricken pad. When the aggregator receives strike metrics data from multiple different accelerometer units, the order of receipt is saved in memory with 1 ms (or other interval) resolution and the strike metrics data is requested from each respective accelerometer unit in turn. Strike metric data for each particular accelerometer unit from which received is stored in chronological order, together with a corresponding identifier of the pad of the accelerometer unit (e.g., via a pad number). Strike metric data that remains stored for a particular period (e.g., 25 ms or other period) is deemed valid to indicate a strike, as opposed to random movement of pads, affected signals, minor missed or random hits to pads, or the like. Valid strike metrics data is communicated to other features of the control unit of the boxing apparatus, for further processing, display, audio or video output, storage, or other operations.

Pause Detection:

A pause, such as may be invoked by a user desiring to halt boxing with the boxing apparatus for an interim period, can be directed by the user, for example, by a particular strike of pad(s) or, according to design, by other user-initiated contact with the pads, display, switch, or other features of the apparatus. As an example, a pause may occur when the aggregator detects a particular simultaneous strike to two pads (e.g., simultaneous strike of "kidney" pads of the apparatus). To reduce the possibility of false detections leading to a pause, the aggregator may check the detections against certain programmed or hardware parameters. In one possible example in which strike to two particular pads initiates the pause, only if those two pads have accumulated a calculated work value falling within a particular higher range and other pads have accumulated a calculated work value falling only within a particular lower range, is the pause indicated. In the event that a pause is detected, according to certain embodiments, the aggregator communicates a pause command to the control unit, followed by the strike metrics data associated with the pause command. In other examples, a pause, even if indicated by testing of parameters, may not be initiated if other control devices, such as of the control unit of the boxing apparatus, so dictate. Of course, other variations are possible for pause and pause detection, as will be understood from this disclosure.

Figure 15:
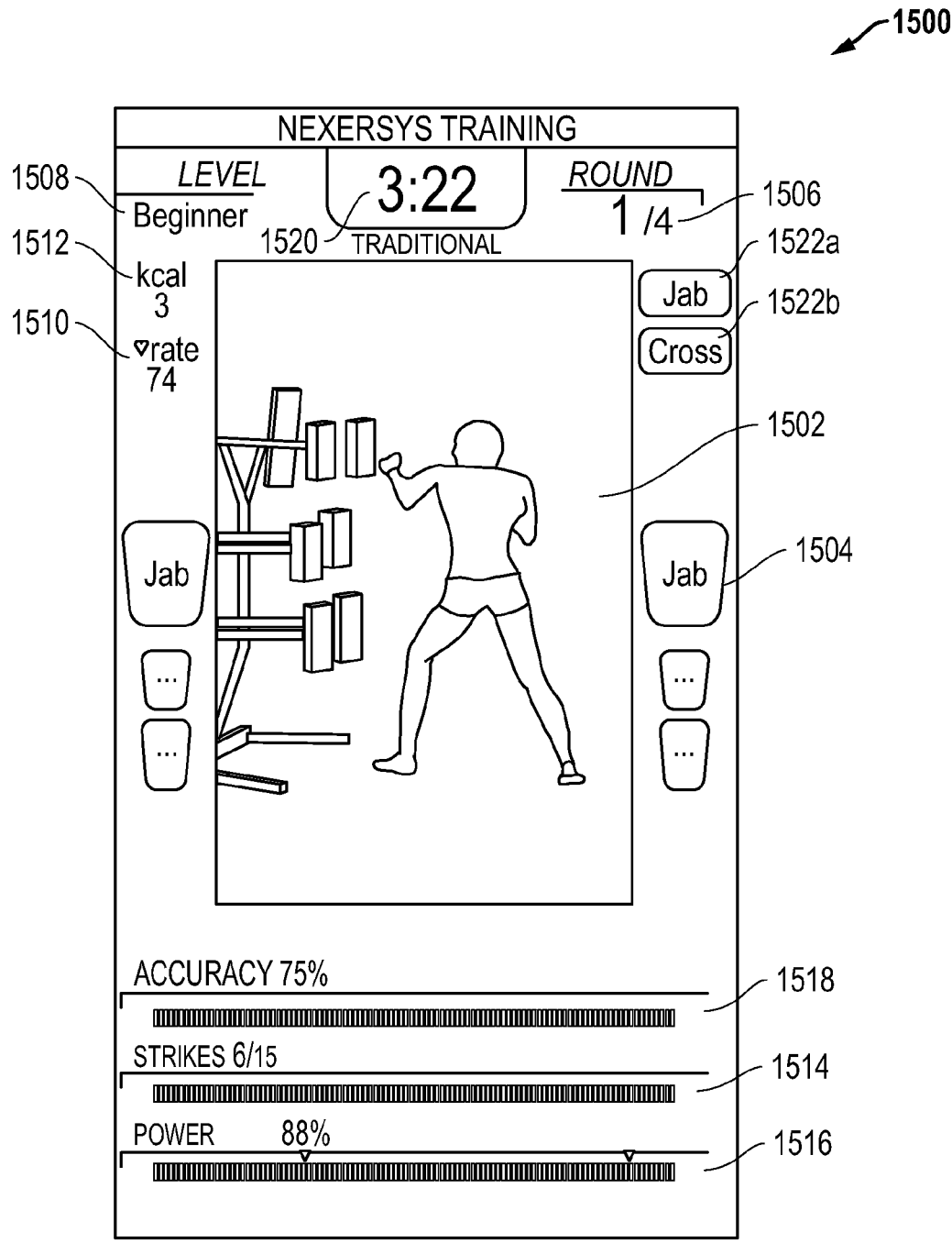
FIG. 15 illustrates an exemplary graphic pad layout and training instructor interface displayed by a video assembly of a boxing apparatus, in a training sequence, according to certain embodiments of the invention.
Figure 16:
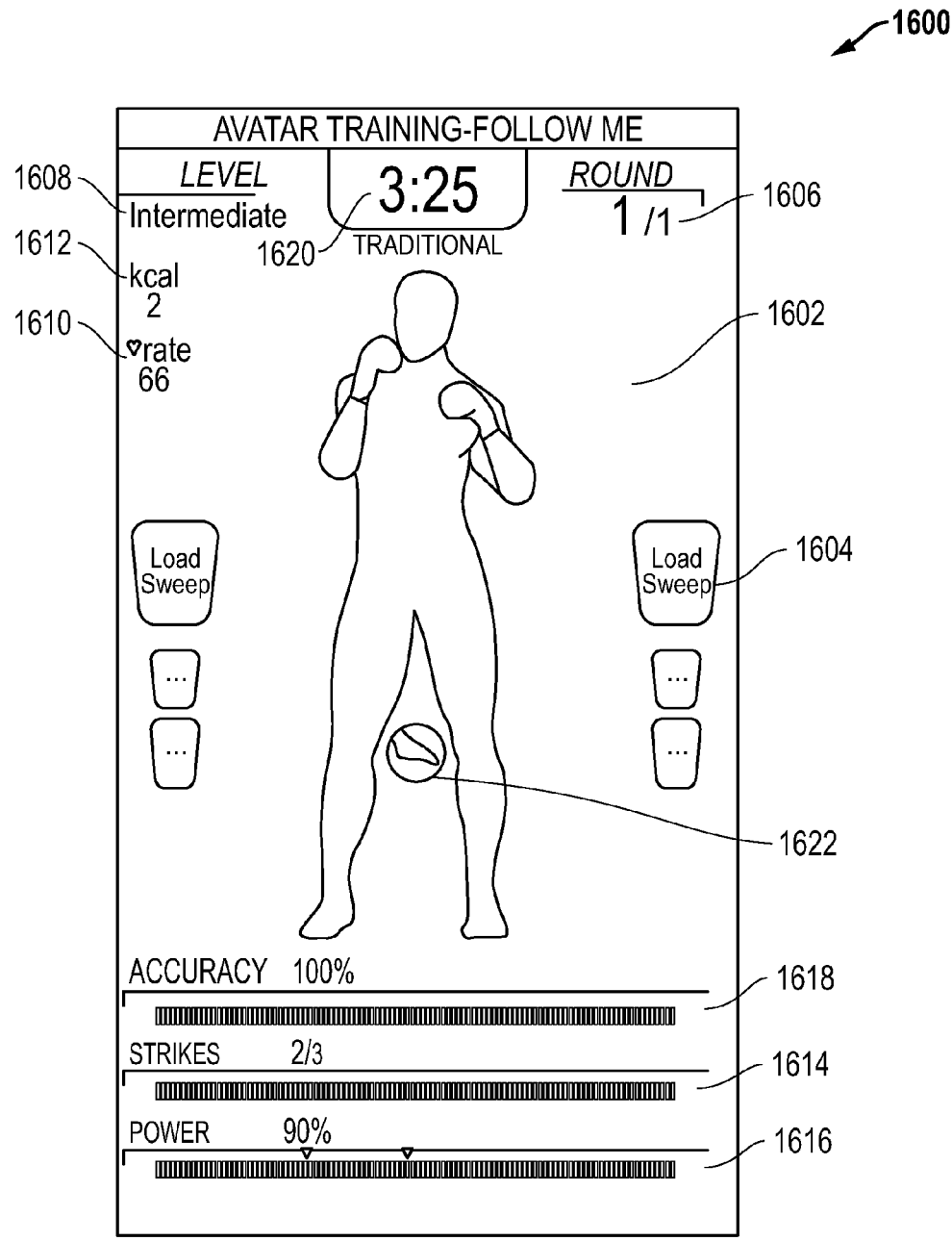
FIG. 16 illustrates an exemplary avatar fighter interface displayed by a video assembly of a boxing apparatus, in a training sequence, according to certain embodiments of the invention.

Referring to FIGS. 15 and 16, an instructor display 1500 and an avatar display 1600 includes certain similarities and differences. During operation of a boxing apparatus according to disclosed embodiments, the control unit of the boxing apparatus, during the boxing routine, directs the video assembly to display animated video graphics, for example, the instructor display 1500, the avatar display 1600, or other display. The instructor display 1500 outputs video 1502 of a human instructor demonstrating techniques and providing instruction. As with the interfaces 1000, 1100 of FIGS. 10 and 11, respectively, the instructor display 1500 includes a graphic portrait 1504 of relative locational arrangement of the pads of the boxing apparatus seen also in the video 1502 in the display. The graphic portrait 1504 automatedly leads a user through sequences of punches and strikes to the pads. As a pad or series of pads is highlighted in the graphic portrait 1504 during a boxing routine processed by the boxing apparatus, the user can respond by punches and strikes to follow the highlighted direction and, if applicable, any order of sequences displayed. Real-time content is output in the instructor display 1500, including, for example, round identifier 1506, level identifier 1508, a user's heart rate indicator 1510, a user's caloric expenditure indicator 1512, a number of strikes tracker 1514, a power of punch tracker 1516, and an accuracy of punch (including correct pad as well as punch response timing) tracker 1518. Other real time output of the instructor display 1500 includes a clock timer 1520 for the round or session.

In addition, the instructor display 1500 also includes punch selection graphics 1522a, 1522b. The punch selection graphics 1522a, 1522b direct the user in a particular type or manner of punch or strike to applicable strike pads. As an example, the video 1502 shows the instructor throwing a jab to the particular highlighted pad indicated by the graphic portrait 1504, whereas the punch selection graphic 1522a also indicates to the user to throw such a jab. Additionally, the the graphic portrait 1504 and the punch selection graphics 1522a,b display a name for the type of the directed punch or strike. The graphic portrait 1504 and the punch selection graphics 1522a, b, and the operations of each in the boxing apparatus, are merely an example, and numerous variations are possible. Other types or manner of punches, such as hook, uppercut, and others, as well as particular body part of the user, such as elbow, head, foot, knee, and so forth, can be directed by the video 1502, the graphic portrait 1504, and the punch selection graphics 1522a,b, or any combination of these, in the embodiments. Moreover, other graphic content or icons are possible in the embodiments, as will be understood from the disclosure.

Like the instructor display 1500, the avatar display 1600 includes real-time content output, for example, round identifier 1606, level identifier 1608, a user's heart rate indicator 1610, a user's caloric expenditure indicator 1612, a number of strikes tracker 1614, a power of punch tracker 1616, an accuracy of punch (including correct pad as well as punch response timing) tracker 1618, and a clock timer 1620 for the round or session. The avatar display 1600 also includes a graphic portrait 1604 of relative locational arrangement of the pads of the boxing apparatus which automatedly leads a user through sequences of punches and strikes to the pads, such as by highlight of pads during a boxing routine processed by the boxing apparatus. Rather than the video 1502, however, the avatar display 1600 includes an animated graphic video 1602 of a boxing opponent avatar. The avatar display 1600 also includes an animated body icon 1622. The animated body icon 1622 directs the user of the boxing apparatus to make particular use of the body part that is illustrated (e.g., the foot) for striking the pad or pads indicated by the graphic portrait 1604. The animated graphic video 1602 of the avatar enacts the punch or strike directed by the graphic portrait 1604 and the animated body icon 1622 and the user follows the avatar. The animated graphic video 1602 of the avatar and the animated body icon 1622 are merely examples, and these can vary during any particular boxing routine or in different sessions or routines.

The avatar display 1600 is one example, from among many alternatives, of a "follow me" routine in which the user is directed to punch and strike as does the avatar with respect to the highlighted pad or pads. Other routines are possible, such as fighting against the avatar or other instructional or training sequences directed or illustrated by example of the animation of the avatar. In a fighting routine against an avatar, strikes and punches may be indicated in the avatar display 1600, for example, shown as highlight or change of color in the illustrated body of the avatar, causing a change in capability or endurance of the avatar, or animatedly responding as might a human boxer. In other routines, the avatar can be a video of a competitor using a separate boxing apparatus in communicative connection with the user's boxing apparatus. In such case, the avatar is animatedly controlled at the user's boxing apparatus responsive to actions of the competitor vis-à-vis the different boxing apparatus and communications received indicative of those actions. Alternatives are also possible, for example, live video may be communicated between respective boxing apparatuses of competitors, and the competitor can be viewed in the avatar display 1600 in lieu of the avatar. A particular avatar may be selected by each user from among possible choices in certain embodiments, or each user of communicatively connected boxing apparatus may have a unique avatar appearing in the display of the competitor.

Figure 17:
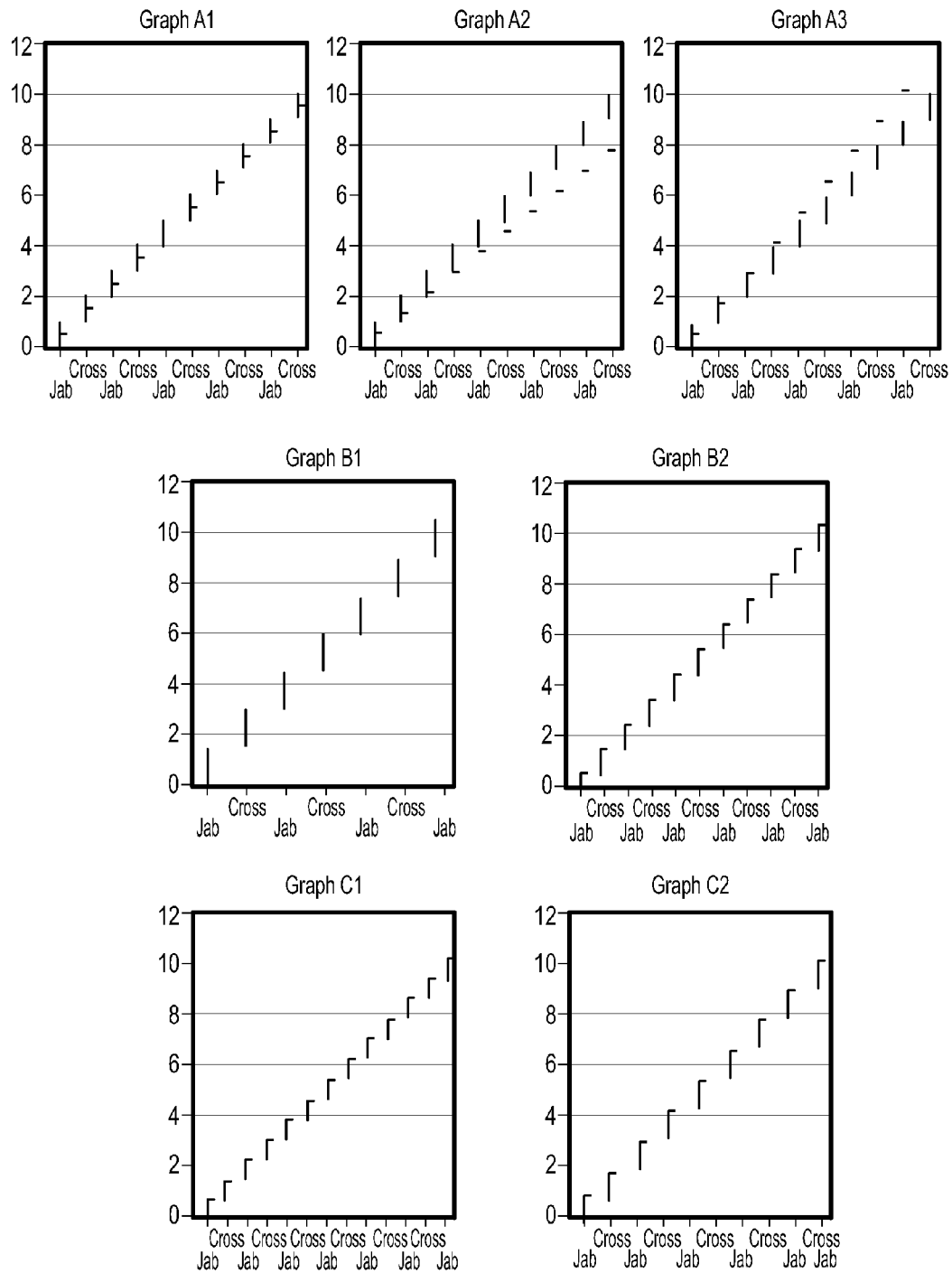
FIG. 17 illustrates graphical representations of slow and fast strike responses by a user of a boxing apparatus, according to certain embodiments of the invention.

Referring to FIG. 17, pace of operation of a machine that requires or directs user input, for example, a boxing apparatus intended to register a user's strikes according to a routine, sequence or pattern, can fail to accommodate a user as illustrated in Graphs A1-A3. As an example for discussion purposes, the machine described is such a boxing apparatus, although similarities to other machines will be understood and are therefore intended as included in embodiments. In a boxing apparatus, the apparatus directs an input by the user of a strike or punch within a pre-determined time slot. Graph A1 illustrates a case in which a user's inputs coincide accurately with pre-determined time slots of the machine. Graph A2, on the other hand, illustrates a case in which the user's inputs precede pre-determined time slots directed by the machine. Graph A3 illustrates a case in which the user's inputs lag the pre-determined time slots for the machine. As can be understood from Graph A2 and Graph A3, a snowball effect can occur, where an early or late input can cause subsequent inputs to become even earlier or even later, respectively.

Figure 18:
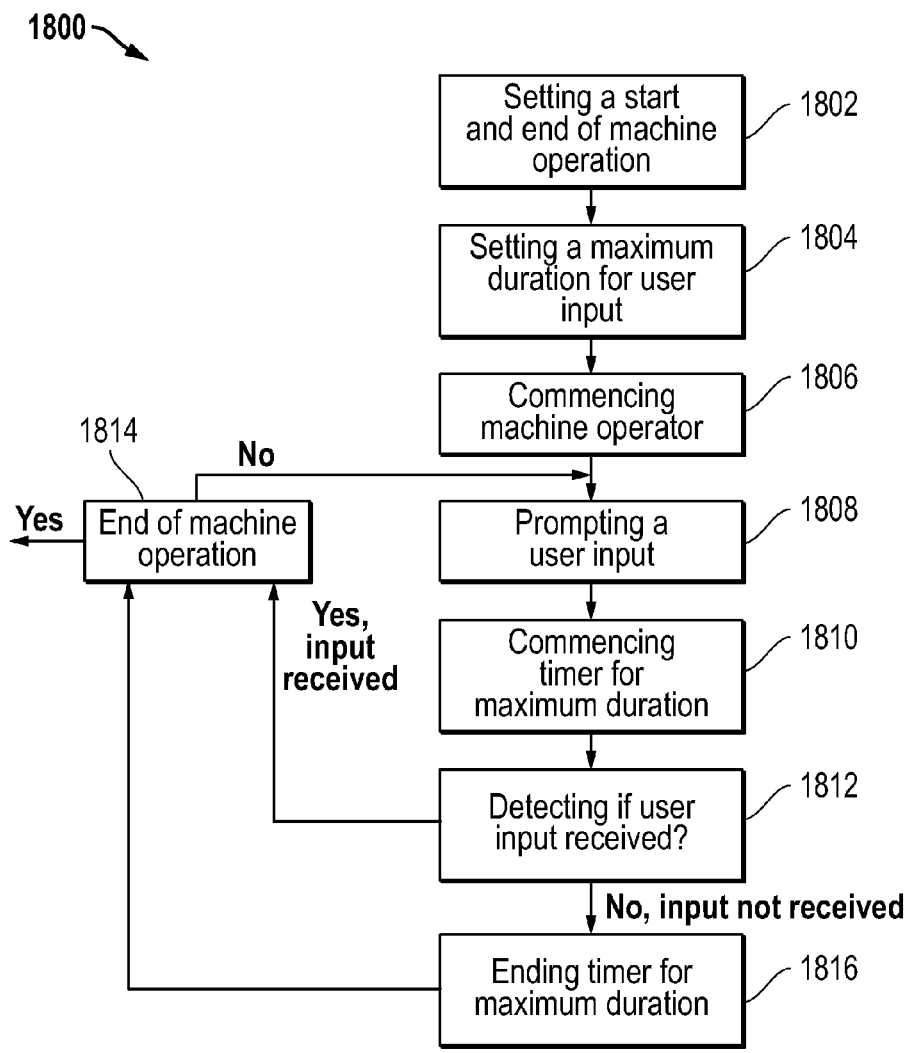
FIG. 18 illustrates a method of varying pace of a boxing routine in a boxing apparatus to accommodate a user providing excessively slow or fast strike responses, according to certain embodiments of the invention.

Referring to FIG. 18, a method 1800 paces a machine's operations to accommodate a user's input. For purposes of example and discussion, the method 1800 is described with respect to a boxing apparatus of embodiments; however, similarities to other machines will be understood and are therefore intended as included for purposes of embodiments. The method 1800 commences with a step 1802 of setting a start and end of operation, for example, selecting a routine of the boxing apparatus of set duration. In a step 1804, a maximum time duration is set for receipt of user input to a pad, such as a maximum time for a user's strike or punch in response to direction for strike of a pad by the boxing apparatus. The boxing apparatus is commenced operating in a step 1806.

As the boxing apparatus operates, such as according to a routine of the apparatus, the boxing apparatus prompts user input to a designated pad in a step 1808. Upon the step of prompting user input 1808, the apparatus commences timing in a step 1810 for a period of the maximum duration and also detecting in a step 1812 to determine if any input of the user is received in accordance with the direction for input. If user input is detected in the step 1812 prior to the end of the step of timing 1810 for the maximum duration, a step 1814 checks if the boxing apparatus operation is completed, such as on completion of the routine of the apparatus. If not completed, the method 1800 returns to the step of prompting user input 1808 in accordance with the operation, such as per the routine. If the machine operation is completed, such as at end of the boxing routine, the method 1800 ends. Where user input is not detected in the step 1812 prior to reaching the end of the maximum duration of the step of timing 1810, timing ends and the method 1800 proceeds to the step 1814 to determine if the operation or routine is completed. If not, the method 1800 returns to the step of prompting use input 1808, and if operation is completed, the method 1800 ends.

The method 1800 may be implemented by a software program stored in tangible media, a processor, a computer, electric circuits, or any combinations of these. As one possible example, the method 1800 is a software program stored in tangible media of a control unit of the boxing apparatus. The software program is operated by a processor and memory of the control unit. Alternately, the method 1800 can be implemented and operated by other devices and components of the boxing apparatus, or via control through communicative connection of the boxing apparatus with another source, such as a computer or processing device having access to the software program or components of the boxing apparatus or peripheral equipment. Variations in operations of the boxing apparatus in accordance with the method 1800 can alter various features and results, for example, if pace of operation is slowed, pad prompts through highlight in the display are adjusted in coordination with the slowed pace, and vice versa for variation to faster pace. In alternatives, the boxing apparatus, because of the timestamps and logging of strike data and calculation of metrics, can as necessary process and display a user's actual pace compared to an apparatus directed pace according to the particular routine and can deliver as output for display, audio, video or otherwise warning or similar signals.

Referring back to FIG. 17, Graph B1 illustrates a case in which user input is not detected within the maximum time duration after prompting for a series of successive input prompts. Graph B2 illustrates the case where the user input is detected prior to the maximum time duration for each of the series of successive input prompts, and indicates that method 1800 returns to a next prompting step upon detection of the user input. Graph C1 illustrates a scenario in which a user's inputs are progressively faster than the directed pace of prompts, where the method 1800 progressively shortens the maximum time duration (increases directed pace) to accommodate the user's faster inputs and reflect accuracy of inputs correctly. Graph C2 illustrates a slower user scenario in which the user's input is behind directed pace for inputs and the method 1800 reduces pace accordingly to correctly reflect accuracy of the inputs.

Similar steps to those of the method 1800 can be employed in or in connection with the boxing apparatus to vary operations to accommodate a user's input of strikes, when that input deviates from a target or target range directed by the boxing apparatus. For example, target power of strikes (or target range of power of strikes) can be automatedly varied by the boxing apparatus, such as by changing directions in displays related to power, or otherwise. Such automated variation may occur if the user either strikes with too much force, which could lead to injury, over-exertion or the like, or with too little force, for the particular routine of operation. Varying operations in these manners enhances the user's experience and capabilities and encourages boxing activity with the boxing apparatus whatever the user's existing level or ability.

In the foregoing specification, the invention has been described with reference to specific embodiments. One of ordinary skill in the art will appreciate, however, that various modifications, substitutions, deletions, and additions can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element of any or all of the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A boxing apparatus, comprising:
   a pad;
   a strike sensor of the pad, for detecting strike to the pad;
   a controller communicatively connected to the sensor;
   a display unit communicatively connected to the controller; and
   a type sensor communicatively connected to the controller, for distinguishing a type of strike to the pad;
   wherein the strike sensor and the type sensor are unitary.
2. The boxing apparatus of claim 1, further comprising:
   a frame;
   an arm connected to the pad and the frame, the arm resistively movable with respect to the frame and opposing striking impact to the pad.
3. The boxing apparatus of claim 1, wherein the pad resists striking impact to the pad.
4. The boxing apparatus of claim 1, further comprising:
   a media module connected to the display and processed by the controller for directing output by the display.
5. The boxing apparatus of claim 4, wherein the media module directs output by the display in response to the strike sensor detecting strike to the pad and the type sensor distinguishing type of strike to the pad.
6. The boxing apparatus of claim 4, wherein the media module directs the display to visually prompt a strike to the pad.
7. The boxing apparatus of claim 6, wherein the strike is prompted, at least in part, by a graphical icon of the display selectively indicating the pad.
8. The boxing apparatus of claim 1, further comprising:
   an audio output device connected to the controller.
9. The boxing apparatus of claim 8, wherein the controller controls the audio output device to audibly prompt a select type of strike to the pad.
10. The boxing apparatus of claim 4, further comprising:
    an audio output device; and
    a media module connected to the audio output device and processed by the controller for directing audio output by the audio output device.
11. The boxing apparatus of claim 10, wherein the media module directs output by the audio output device in response to the strike sensor detecting strike to the pad and the type sensor distinguishing type of strike to the pad.
12. The boxing apparatus of claim 10, wherein the media module directs the audio output device to audibly prompt a strike to the pad.
13. A sensor unit for a boxing apparatus, comprising:
    an accelerometer for measuring a strike; and
    a signal processor communicatively connected to the accelerometer, for discerning the strike and calculating values relative to a peak acceleration, direction, total work, and total energy for the strike.
14. The sensor unit of claim 13, further comprising:
    a filter communicatively connected to the accelerometer for eliminating insignificant measures of the accelerometer.
15. A method of varying an operation of a boxing apparatus to accommodate input of a user of the boxing apparatus responsive to direction of the boxing apparatus, comprising the steps of:
    setting a maximum duration for the user input;
    prompting the user input;
    timing for the maximum duration;
    detecting if the user input is received;
    returning to the step of prompting upon receipt of the user input if prior to expiration of the maximum duration; and
    returning to the step of prompting upon expiration of the maximum duration if the user input is not received.
16. The method of claim 15, further comprising the step of:
    varying the maximum duration if the user input is not received prior to expiration of the maximum duration.

* * * * *